United States Patent
Zhang et al.

(10) Patent No.: US 12,549,476 B2
(45) Date of Patent: Feb. 10, 2026

(54) COMMUNICATION METHOD AND APPARATUS

(71) Applicant: HUAWEI TECHNOLOGIES CO., LTD., Guangdong (CN)

(72) Inventors: Shuqi Zhang, Beijing (CN); Xiaoshuang Li, Shenzhen (CN); Yong Wang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 321 days.

(21) Appl. No.: 18/489,960

(22) Filed: Oct. 19, 2023

(65) Prior Publication Data

US 2024/0048480 A1    Feb. 8, 2024

Related U.S. Application Data

(63) Continuation of application No. PCT/CN2022/082058, filed on Mar. 21, 2022.

(30) Foreign Application Priority Data

Apr. 20, 2021 (CN) .......................... 202110425461.3

(51) Int. Cl.
    *H04L 45/00*     (2022.01)
    *H04L 45/302*    (2022.01)
    (Continued)

(52) U.S. Cl.
    CPC ............ *H04L 45/38* (2013.01); *H04L 45/302* (2013.01); *H04W 28/24* (2013.01); *H04W 76/10* (2018.02)

(58) Field of Classification Search
    None
    See application file for complete search history.

(56) References Cited

U.S. PATENT DOCUMENTS

2019/0223047 A1   7/2019  Gundavelli et al.
2019/0268973 A1*  8/2019  Bull .................. H04W 92/02

FOREIGN PATENT DOCUMENTS

CN         105589506 A      5/2016

OTHER PUBLICATIONS

3GPP TS 23.501 V17.0.0 (Mar. 2021),3rd Generation Partnership Project;Technical Specification Group Services and System Aspects-;System architecture for the 5G System (5GS);Stage 2(Release 17),total 489 pages.

(Continued)

*Primary Examiner* — Christine T Duong

(57) ABSTRACT

A communication method is disclosed. The method includes: A session management function network element sends a first path establish request to a transport network control network element, where the first path establish request includes an identifier of an access network device, an identifier of a mobile gateway selected for a session, and a first transport network (TN) Quality of Service (QoS) parameter of a first QoS flow in the session, and the first TN QoS parameter of the first QoS flow is determined based on a TN QoS parameter mapped to a first service type of the first QoS flow, the access network device, and the mobile gateway. The session management function network element receives a first path establish response from the transport network control network element, where the first path establish response includes information about a first TN transmission path of the first QoS flow.

20 Claims, 14 Drawing Sheets

(51) Int. Cl.
    *H04W 28/24*     (2009.01)
    *H04W 76/10*     (2018.01)

(56) References Cited

OTHER PUBLICATIONS

IEEE P802.1Q-REV/D2.2,Draft Standard for Local and metropolitan area networks—Bridges and Bridged Networks,Jul. 30, 2014,total 1865 pages.

IEEE P802.1p,Wikipedia,URL:https://en.wikipedia.org/wiki/Main_Page,Feb. 20, 2006,total 2 pages.

P. Almquist et al,"Type of Service in the Internet Protocol Suite",Network Working Group RFC1349,Jul. 1992,total 28 pages.

K. Nichols et al,"Definition of the Differentiated Services Field (DS Field) in the IPv4 and IPv6 Headers",Network Working Group RFC2474,Dec. 1998,total 20 pages.

\* cited by examiner

COMMUNICATION METHOD AND APPARATUS

CROSS-REFERENCE TO RELATED APPLICATIONS

This application is a continuation of International Application No. PCT/CN2022/082058, filed on Mar. 21, 2022, which claims priority to Chinese Patent Application No. 202110425461.3, filed on Apr. 20, 2021. The disclosures of the aforementioned applications are hereby incorporated by reference in their entireties.

TECHNICAL FIELD

Embodiments of the present disclosure relate to the field of communication technologies, and in particular, to a communication method and apparatus.

BACKGROUND

As a 5th generation (5G) mobile communication system is gradually commercialized worldwide, operators are actively exploring 5G to enable various industries. Unlike a 4G mobile communication system that is mainly for an individual user (2C) service, an important expansion direction of the 5G mobile communication system is an enterprise user (2B) service, and the 2B service has diversified quality of service (QoS) requirements. Therefore, in addition to enhanced mobile broadband (eMBB), the 5G mobile communication system supports massive connection (mMTC) and ultra-reliable and low latency communication (uRLLC) scenarios in an architecture design to meet diversified and differentiated application requirements. Therefore, a QoS framework is redefined and a slicing technology is defined in the 5G mobile communication system. As shown in FIG. 1, a deployment structure of the 5G mobile communication system usually includes an access network, a transport network (TN), and a core network (CN). An uplink data packet passes through each device in the access network, the transport network, and the core network in turn, and a downlink data packet passes through each device in the core network, the transport network, and the access network in turn.

Service-level QoS requirements are generally end-to-end requirements. Therefore, QoS coordination is required among the access network, the transport network, and the core network to ensure end-to-end QoS. Currently, as an organization for formulating standards for mobile communication systems, the 3rd generation partnership project (3GPP) is responsible for formulating related specifications for a terminal device, the access network, and the core network, but not for the transport network. Therefore, an end-to-end QoS definition is unified between the access network and the core networks, but is not consistent with that in the transport network. The transport network cannot provide corresponding QoS guarantees for services of different levels based on service-defined QoS requirements, and consequently a service cannot obtain an end-to-end QoS guarantee.

SUMMARY

Embodiments of the present disclosure provide a communication method and apparatus, to provide an end-to-end QoS guarantee for a service in an entire mobile communication system.

According to a first aspect, an embodiment of the present disclosure provides a communication method. The method includes: A session management function network element receives a session establishment request from an access network device, where a session that the session establishment request requests to establish includes a first quality of service (QoS) flow; the session management function network element sends a first path establish request to a transport network control network element, where the first path establish request includes an identifier of the access network device, an identifier of a mobile gateway selected for the session, and a service instance identifier and a first transport network (TN) QoS parameter that are of the first QoS flow, and the first TN QoS parameter of the first QoS flow is determined based on a TN QoS parameter mapped to a first service type of the first QoS flow, the access network device, and the mobile gateway; the session management function network element receives a first path establish response from the transport network control network element, where the first path establish response includes the service instance identifier of the first QoS flow and information about a first TN transmission path; and the session management function network element sends a session resource setup request to the access network device, where the session resource setup request includes the service instance identifier of the first QoS flow and the information about the first TN transmission path.

In this embodiment of the present disclosure, the session management function network element determines a TN QoS parameter of a QoS flow based on a mapping rule between a TN QoS parameter, and a service type of a QoS flow, an access network device, and a mobile gateway, and unify a service QoS definition in a transport network with that in an access network and a core network, thereby providing a QoS guarantee for transmission of a service data packet of a QoS flow in the transport network, and providing an end-to-end QoS guarantee for a service in an entire mobile communication system. In addition, in this embodiment, a QoS guarantee at a QoS flow granularity is implemented, and is more flexible than a QoS guarantee at a network slice level.

In an example embodiment, the method further includes: The session management function network element sends a first N4 session establishment request to the mobile gateway, where the first N4 session establishment request includes the service instance identifier of the first QoS flow and the information about the first TN transmission path.

In the foregoing embodiment, the information about the first TN transmission path of the first QoS flow is sent to the mobile gateway, thereby providing a QoS guarantee for a downlink data packet of a QoS flow in the transport network.

In an example embodiment, the method further includes: The session management function network element sends a QoS configuration request to a network management network element, where the QoS configuration request includes an identifier or identifiers of one or more mobile gateways managed by the session management function network element; and the session management function network element receives a QoS configuration response from the network management network element, where the QoS configuration response includes a mapping rule or mapping rules, corresponding to the one or more mobile gateways, between a TN QoS parameter, and a service type of a QoS flow, an access network device, and a mobile gateway.

The QoS configuration request may be used to request, from the network management network element, the mapping rule or the mapping rules, corresponding to the one or more mobile gateways managed by the session management function network element, between a TN QoS parameter, and a service type of a QoS flow, an access network device, and a mobile gateway. The QoS configuration response may be used by the network management network element to deliver a corresponding mapping rule between a TN QoS parameter and a service type of a QoS flow, an access network device, and a mobile gateway to the session management function network element.

In the foregoing design, the network management network element may configure a TN QoS parameter of each service, that is, a TN QoS parameter of each QoS flow, and may synchronize with the session management function network element, so that a service QoS definition can be unified in the access network, the transport network, and the core network, thereby providing a QoS guarantee for a QoS flow in the transport network.

In an example embodiment, the method further includes: The session management function network element receives a first session modification request from the access network device, where the first session modification request requests to establish a second QoS flow in the session; the session management function network element sends a second path establish request to the transport network control network element, where the second path establish request includes the identifier of the access network device, the identifier of the mobile gateway, and a service instance identifier and a first TN QoS parameter that are of the second QoS flow, and the first TN QoS parameter of the "econ" QoS flow is determined based on a TN QoS parameter mapped to a first service type of the second QoS flow, the access network device, and the mobile gateway; the session management function network element receives a second path establish response from the transport network control network element, where the second path establish response includes the service instance identifier of the second QoS flow and information about a first TN transmission path; and the session management function network element sends a first session resource modify request to the access network device, where the first session resource modify request includes the service instance identifier of the second QoS flow and the information about the first TN transmission path.

In an example embodiment, the method further includes: The session management function network element sends a second N4 session establishment request to the mobile gateway, where the second N4 session establishment request includes the service instance identifier of the second QoS flow and the information about the first TN transmission path.

In the foregoing design, for a newly added QoS flow in the session, a TN QoS parameter of the newly added QoS flow may be determined based on the mapping rule between a TN QoS parameter and a service type of a QoS flow, an access network device, and a mobile gateway, thereby providing a QoS guarantee for transmission of a service data packet of the newly added QoS flow in the transport network.

In an example embodiment, the method further includes: The session management function network element receives a second session modification request from the access network device, where the second session modification request requests to modify a third QoS flow in the session; the session management function network element sends a path modify request to the transport network control network element, where the path modify request includes a service instance identifier and a second TN QoS parameter that are of the third QoS flow, and the second TN QoS parameter of the "thir" QoS flow is determined based on a TN QoS parameter mapped to a second service type of the third QoS flow, the access network device, and the mobile gateway; the session management function network element receives a path modify response from the transport network control network element, where the path modify response includes the service instance identifier of the third QoS flow and information about a second TN transmission path; and the session management function network element sends a second session resource modify request to the access network device, where the second session resource modify request includes the service instance identifier of the third QoS flow and the information about the second TN transmission path.

In an example embodiment, the method further includes: The session management function network element sends an N4 session modification request to the mobile gateway, where the N4 session modification request includes the service instance identifier of the third QoS flow and the information about the second TN transmission path.

In the foregoing embodiment, for a changed QoS flow in the session, a new TN QoS parameter corresponding to the changed QoS flow may be determined based on the mapping rule between a TN QoS parameter and a service type of a QoS flow, an access network device, and a mobile gateway, thereby providing a QoS guarantee for transmission of a service data packet of the changed QoS flow in the transport network.

In an example embodiment, the method further includes: The session management function network element receives a third session modification request from the access network device, where the third session modification request requests to delete a fourth QoS flow in the session; and the session management function network element sends a path release request to the transport network control network element, where the path release request includes a service instance identifier of the fourth QoS flow.

In the foregoing embodiment, for a deleted QoS flow, the session management function network element requests the transport network control network element to release a TN transmission path of the deleted QoS flow, thereby saving processing resources and bandwidth resources.

In an example embodiment, the method further includes: The session management function network element receives a path release notification from the transport network control network element, where the path release notification includes a service instance identifier of a fifth QoS flow in the session; and the session management function network element releases the fifth QoS flow, or reselects a mobile gateway for the session.

In the foregoing embodiment, for a QoS flow whose TN transmission path does not meet a TN QoS parameter, the session management function network element releases the QoS flow, or reselects a mobile gateway for the session, thereby improving communication quality and meeting a communication requirement.

In an example embodiment, the TN QoS parameter includes: a scheduling priority, a transmission delay, a packet error rate, a maximum flow rate, and/or a guaranteed flow rate.

In the foregoing embodiment, a QoS guarantee may be provided for transmission of a service data packet of a QoS flow in the transport network based on one or more of the scheduling priority, the transmission delay, the packet error rate, the maximum flow rate, the guaranteed flow rate, and the like, thereby improving transmission quality of the service data packet.

According to a second aspect, an embodiment of the present disclosure provides a communication method. The method includes: A transport network control network element receives a first path establish request from a session management function network element, where the first path establish request includes an identifier of an access network device, an identifier of a mobile gateway, and a service instance identifier and a first transport network (TN) QoS parameter that are of a first QoS flow; the transport network control network element determines a first TN transmission path between the access network device and the mobile gateway for the first QoS flow based on the first TN QoS parameter of the first QoS flow; and the transport network control network element sends a first path establish response to the session management function network element, where the first path establish response includes the service instance identifier of the first QoS flow and information about the first TN transmission path.

In an example embodiment, the method further includes: The transport network control network element receives a second path establish request from the session management function network element, where the second path establish request includes the identifier of the access network device, the identifier of the mobile gateway, and a service instance identifier and a first TN QoS parameter that are of a second QoS flow; the transport network control network element determines a first TN transmission path between the access network device and the mobile gateway for the second QoS flow based on the first TN QoS parameter of the second QoS flow; and the transport network control network element sends a second path establish response to the session management function network element, where the second path establish response includes the service instance identifier of the second QoS flow and information about the first TN transmission path.

In an example embodiment, the method further includes: The transport network control network element receives a path modify request from the session management function network element, where the path modify request includes a service instance identifier and a second TN QoS parameter that are of a third QoS flow; and the transport network control network element determines a second TN transmission path between the access network device and the mobile gateway for the third QoS flow based on the second TN QoS parameter of the third QoS flow; and the transport network control network element sends a path modify response to the session management function network element, where the path modify response includes the service instance identifier of the third QoS flow and information about the second TN transmission path.

In an example embodiment, the method further includes: The transport network control network element receives a path release request from the session management function network element, where the path release request includes a service instance identifier of a fourth QoS flow; and the transport network control network element releases a TN transmission path of the fourth QoS flow.

In an example embodiment, the method further includes: When the transport network controller determines that there is a fifth QoS flow whose TN transmission path does not meet a TN QoS parameter, the transport network controller sends a path release notification to the session management function network element, where the path release notification includes a service instance identifier of the fifth QoS flow.

In an example embodiment, the TN QoS parameter includes: a scheduling priority, a transmission delay, a packet error rate, a maximum flow rate, and/or a guaranteed flow rate.

According to a third aspect, an embodiment of the present disclosure provides a communication method. The method includes: A network management network element receives a quality of service (QoS) configuration request from a session management function network element, where the QoS configuration request includes an identifier or identifiers of one or more mobile gateways managed by the session management function network element; and the network management network element sends a QoS configuration response to the session management function network element, where the QoS configuration response includes a mapping rule or mapping rules, corresponding to the one or more mobile gateways, between a TN QoS parameter, and a service type of a QoS flow, an access network device, and a mobile gateway.

According to a fourth aspect, an embodiment of the present disclosure provides a communication apparatus. The apparatus has a function of implementing the method in the first aspect or any example embodiment of the first aspect, and the function may be implemented by hardware, or by hardware executing corresponding software. The hardware or software includes one or more units (modules) corresponding to the foregoing function, for example, a communication unit and a processing unit.

In an example embodiment, the apparatus may be a chip or an integrated circuit.

In an example embodiment, the apparatus includes a processor and an interface circuit. The processor is coupled to the interface circuit, to implement a function of the method in the first aspect or any example embodiment of the first aspect. It may be understood that the interface circuit may be a transceiver or an input/output interface. The apparatus may further include a memory, and the memory stores a program that may be executed by the processor to implement the function of the method in the first aspect or any example embodiment of the first aspect.

In an example embodiment, the apparatus may be a session management function network element.

According to a fifth aspect, an embodiment of the present disclosure provides a communication apparatus. The apparatus has a function of implementing the method in the second aspect or any example embodiment of the second aspect, and the function may be implemented by hardware, or by hardware executing corresponding software. The hardware or software includes one or more units (modules) corresponding to the foregoing function, for example, a communication unit and a processing unit.

In an example embodiment, the apparatus may be a chip or an integrated circuit.

In an example embodiment, the apparatus includes a processor and an interface circuit. The processor is coupled to the interface circuit, to implement a function of the method in the second aspect or any example embodiment of the second aspect. It may be understood that the interface circuit may be a transceiver or an input/output interface. The apparatus may further include a memory, and the memory stores a program that may be executed by the processor to implement the function of the method in the second aspect or any example embodiment of the second aspect.

In an example embodiment, the apparatus may be a transport network control network element.

According to a sixth aspect, an embodiment of the present disclosure provides a communication apparatus. The apparatus has a function of implementing the method in the third aspect, and the function may be implemented by hardware, or by hardware executing corresponding software. The hardware or software includes one or more units (modules) corresponding to the foregoing function, for example, a communication unit and a processing unit.

In an example embodiment, the apparatus may be a chip or an integrated circuit.

In an example embodiment, the apparatus includes a processor and an interface circuit. The processor is coupled to the interface circuit, to implement a function of the method in the third aspect. It may be understood that the interface circuit may be a transceiver or an input/output interface. The apparatus may further include a memory, and the memory stores a program that may be executed by the processor to implement the function of the method in the third aspect.

In an example embodiment, the apparatus may be a network management network element.

According to a seventh aspect, an embodiment of the present disclosure further provides a communication system. The system includes a session management function network element, a transport network control network element, and a network management network element.

The session management function network element is configured to receive a session establishment request from an access network device, where a session that the session establishment request requests to establish includes a first quality of service (QoS) flow;
  the session management function network element is further configured to send a first path establish request to the transport network control network element, where the first path establish request includes an identifier of the access network device, an identifier of a mobile gateway selected for the session, and a service instance identifier and a first transport network (TN) QoS parameter that are of the first QoS flow, and the first TN QoS parameter of the first QoS flow is determined based on a TN QoS parameter mapped to a first service type of the first QoS flow, the access network device, and the mobile gateway;
  the transport network control network element is configured to: receive the first path establish request, and determine a first TN transmission path between the access network device and the mobile gateway for the first QoS flow based on the first TN QoS parameter of the first QoS flow;
  the transport network control network element is further configured to send a first path establish response to the session management function network element, where the first path establish response includes the service instance identifier of the first QoS flow and information about the first TN transmission path; and
  the session management function network element is further configured to: receive the first path establish response, and send a session resource setup request to the access network device, where the session resource setup request includes the service instance identifier of the first QoS flow and the information about the first TN transmission path.

In an example embodiment, the session management function network element is further configured to send a first N4 session establishment request to the mobile gateway, where the first N4 session establishment request includes the service instance identifier of the first QoS flow and the information about the first TN transmission path.

In an example embodiment, the session management function network element is further configured to send a QoS configuration request to the network management network element, where the QoS configuration request includes an identifier or identifiers of one or more mobile gateways managed by the session management function network element;
  the network management network element is configured to: receive the QoS configuration request, and send a QoS configuration response to the session management function network element, where the QoS configuration response includes a mapping rule or mapping rules, corresponding to the one or more mobile gateways, between a TN QoS parameter, and a service type of a QoS flow, an access network device, and a mobile gateway; and
  the session management function network element is further configured to receive the QoS configuration response.

According to an eighth aspect, an embodiment of the present disclosure further provides a communication system. The system includes at least two of a session management function network element, a transport network control network element, and a network management network element, where the session management function network element may perform the method in the first aspect or any possible embodiment of the first aspect, the transport network control network element may perform the method in the second aspect or any possible embodiment of the second aspect, and the network management network element may perform the method in the third aspect.

According to a ninth aspect, an embodiment of the present disclosure provides a computer-readable storage medium. The computer-readable storage medium has a computer program or instructions for performing the method in the first aspect or any possible embodiment of the first aspect, or the method in the second aspect or any possible embodiment of the second aspect, or the method in the third aspect.

According to a tenth aspect, an embodiment of the present disclosure further provides a computer program product, including a computer program or instructions. When the computer program or the instructions is/are executed, the method in the first aspect or any possible embodiment of the first aspect may be implemented, or the method in the second aspect or any possible embodiment of the second aspect may be implemented, or the method in the third aspect may be implemented.

According to an eleventh aspect, an embodiment of the present disclosure further provides a chip system. The chip system includes a processor and an interface. The processor is configured to invoke a computer program from the interface and run the computer program. When the processor executes the computer program, the method in the first aspect or any possible embodiment of the first aspect may be implemented, or the method in the second aspect or any possible embodiment of the second aspect may be implemented, or the method in the third aspect may be implemented.

For technical effects that can be achieved in the second aspect to the eleventh aspect, refer to the technical effects that can be achieved in the first aspect.

DESCRIPTION OF EMBODIMENTS

Figure 1:
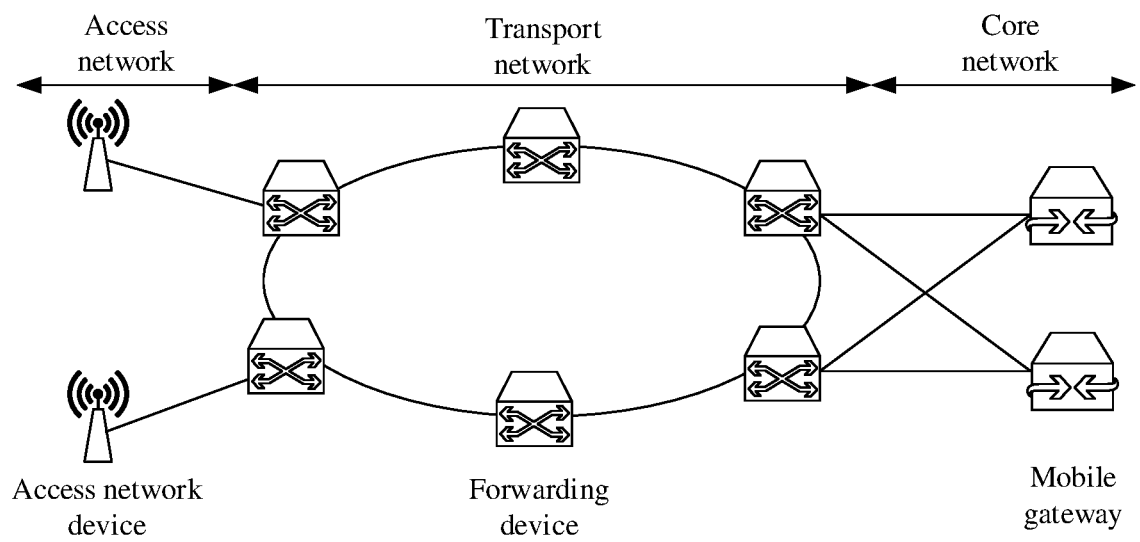
FIG. 1 is a schematic diagram of an example deployment structure of a mobile communication system.
Figure 2:
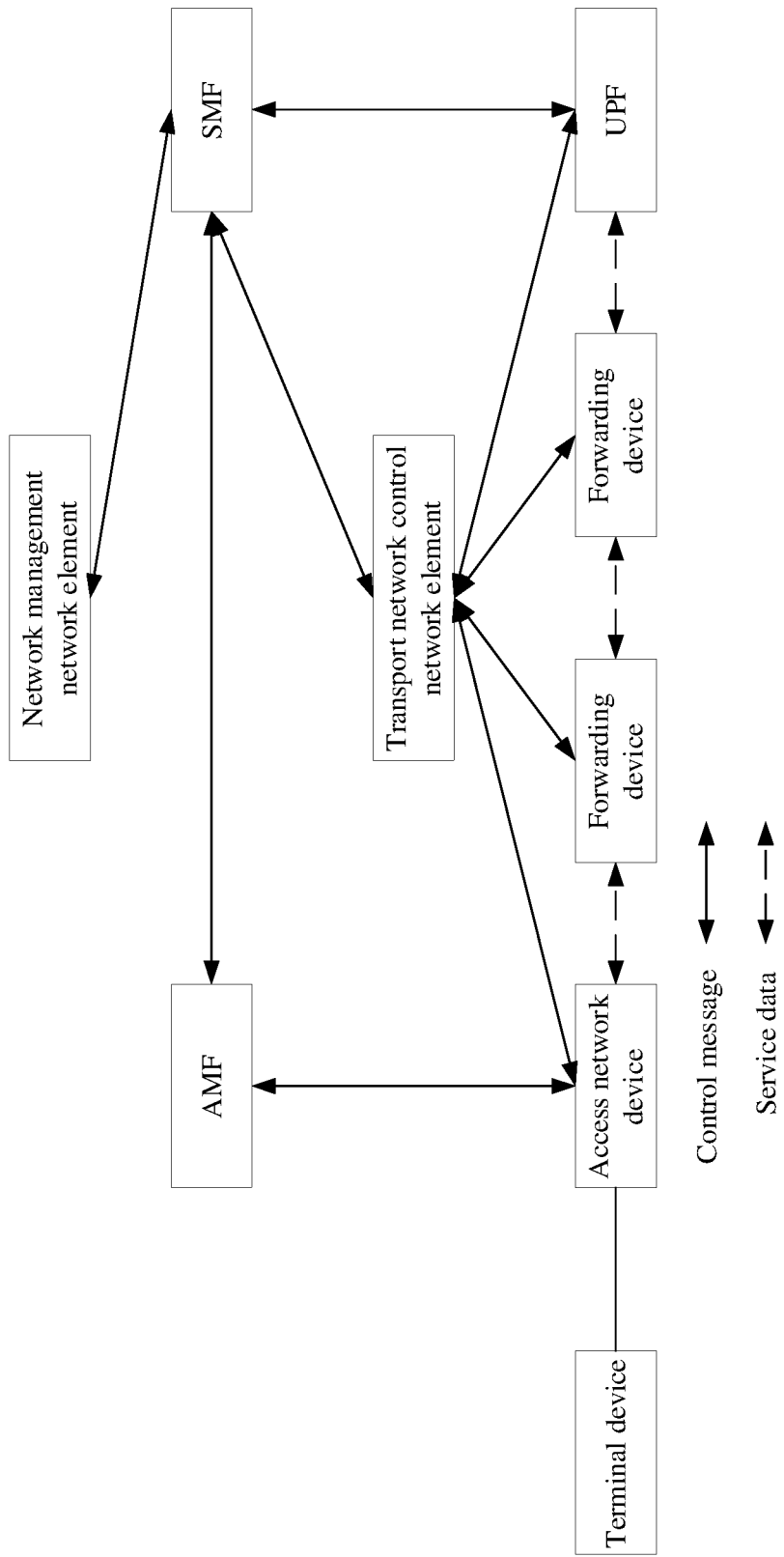
FIG. 2 is a schematic diagram of an example architecture of a mobile communication system according to an embodiment of the present disclosure.

Technical solutions in the embodiments of the present disclosure may be applied to various mobile communication systems such as a 5G mobile communication system and a 4G and 5G converged mobile communication system, or applied to a future mobile communication system or other similar mobile communication systems such as a 6G mobile communication system and a mobile communication dedicated network system. Specifically, as shown in FIG. 2, an architecture of a mobile communication system to which the embodiments of the present disclosure are applied may include a terminal device and an operator network.

The operator network may include a network management network element, an access and mobility management function (AMF) network element, a session management function (SMF) network element, a user plane function (UPF) network element, a transport network control network element, an access network device, a forwarding device, and the like.

The terminal device (which may also be referred to as user equipment (UE)) is a device having a wireless transceiver function, and may be deployed on land, for example, including an indoor or outdoor device, a handheld device, or a vehicle-mounted device, may be deployed on water (for example, on a ship), or may be deployed in the air (for example, on an airplane, a balloon, and a satellite). The terminal device may be a mobile phone, a tablet computer (pad), a computer having a wireless transceiver function, a virtual reality (VR) terminal, an augmented reality (AR) terminal, a wireless terminal in industrial control (industrial control), a wireless terminal in self driving, a wireless terminal in telemedicine (remote medical), a wireless terminal in a smart grid, a wireless terminal in transportation safety, a wireless terminal in a smart city, a wireless terminal in a smart home, or the like.

If the various terminal devices described above are located in a vehicle (for example, placed in the vehicle or mounted in the vehicle), the terminal devices may be all considered as vehicle-mounted terminal devices. For example, the vehicle-mounted terminal device is also referred to as an on-board unit (OBU).

The access network device may also be referred to as a (radio) access network ((R)AN) device, and is a device that provides a wireless communication function for the terminal device and is mainly used to provide functions such as air interface access of the terminal device, packet transmission of the terminal device, and mobility management of the terminal device. For example, the access network device includes but is not limited to a base station (gNB) in 5G, an evolved NodeB (eNB), a radio network controller (RNC), a NodeB (NB), a base station controller (BSC), a base transceiver station (BTS), a home base station (for example, home evolved NodeB, or home NodeB, HNB), a baseband unit (BBU), a transmission and reception point (TRP), a transmission point (TP), and a mobile switching center. In addition, in a network structure, the access network device may include a central unit (CU) node and a distributed unit (DU) node. Functions of a part of protocol layers of the access network device are placed in the CU for centralized control and functions of a part or all of remaining protocol layers are distributed in the DU, and the CU controls the DU in a centralized manner.

The network management network element mainly manages network elements in a core network and provides functions such as configuration management, alarm management, performance management, topology management, software management, and security and log management for the network elements (for example, an AMF network element and an SMF network element) in the core network. ATN QoS constraint parameter of each type of service may be configured, and configuration is synchronized with that on the SMF network element.

The AMF network element is a control plane network element provided by the operator network, and is responsible for functions such as access and mobility management of the terminal device, management of the access network device, selection of the SMF network element, and message forwarding between the access network device and the SMF network element.

The SMF network element is a control plane network element provided by the operator network, and mainly provides functions such as session management of the terminal device, internet protocol (IP) address allocation and management of the terminal device, selection of the UPF network element, and a downlink data notification.

The UPF network element is a gateway provided by the operator for communication between the operator network and a data network (DN), and mainly provides functions such as a DN anchor, packet routing and forwarding, packet detection, packet QoS processing, and packet marking at a transport layer.

The transport network control network element may also be referred to as a transport network controller, a transport network control device, a bearer network control device, or the like, and generally combines a network management function with a software-defined network (SDN) controller function to provide functions such as configuration, alarm, and performance management of a transport network, traffic engineering (TE) management, and network analysis.

The forwarding device may be a device having a data exchange and forwarding function, such as a router or a switch.

It may be understood that the network elements or the devices may be network elements in a hardware device, software functions running on dedicated hardware, or virtualized functions instantiated on a platform (for example, a cloud platform). Optionally, the foregoing network elements or the functions may be implemented by one device or a plurality of devices, or may be one functional module in one device. This is not specifically limited in the embodiments of the present disclosure.

In addition, the foregoing 5G network architecture is merely an example of a possible network architecture to which the technical solutions provided in the present disclosure are applied. The technical solutions provided in the present disclosure may be further applied to a future network architecture or other similar network architectures such as a 6G network architecture.

Before the embodiments of the present disclosure are described, some terms in the embodiments of the present disclosure are first described to facilitate understanding of a person skilled in the art.

(1) QoS flow: In a 5G mobile communication system, QoS is a finest granularity for forwarding processing. Same forwarding processing is performed on all traffic mapped to a same QoS flow. Separate QoS flows are required for different QoS forwarding processing (a scheduling policy, a queue management policy, a rate shaping policy, a radio link control (RLC) protocol configuration, and the like).

(2) A 5G QoS identifier (5QI) is a scalar and is used for a 5G QoS flow based on a specific QoS forwarding behavior (for example, a packet loss rate or a packet delay budget). In the 5G mobile communication system, different QoS parameter sets and requirements are defined for different services, and one 5QI is set for each parameter set. In both an access network and a core network, a 5QI is used to be associated with a data packet (which may also be referred to as a datagram) of each type of service, and corresponding QoS guarantee processing is performed during internal processing. In a 5G standard, QoS parameter sets of a part of services are predefined and user-defined QoS parameter sets are also supported. The following Table 1 shows 5QIs and corresponding QoS parameter set requirements of some 5G predefined services, where 5QI Value represents a 5QI value, Resource Type represents a resource type, Default Priority Level represents a default priority, Packet Delay Budget represents a packet delay budget, Packet Error Rate represents a packet error rate, Default Maximum Data Burst Volume represents a default maximum data burst volume, Default Averaging Window represents a default average window, and Example Services represent example services.

TABLE 1

| 5 QI Value | Resource Type | Default Priority Level | Packet Delay Budget | Packet Error Rate | Default Maximum Data Burst Volume | Default Averaging Window | Example Services |
|---|---|---|---|---|---|---|---|
| 1 | GBR | 20 | 100 ms | 10-2 | N/A | 2000 ms | Conversational Voice |
| 2 |  | 40 | 150 ms | 10-3 | N/A | 2000 ms | Conversational Video (Live Streaming) |
| 3 |  | 30 | 50 ms | 10-3 | N/A | 2000 ms | Real Time Gaming, V2X messages Electricity distribution-medium voltage, Process automation-monitoring |
| 4 |  | 50 | 300 ms | 10-6 | N/A | 2000 ms | Non-Conversational Video (Buffered Streaming) |
| 5 | Non-GBR | 10 | 100 ms | 10-6 | N/A | N/A | IMS Signalling |
| 6 |  | 60 | 300 ms | 10-6 | N/A | N/A | Video (Buffered Streaming) TCP-based (e.g., www, e-mail, chat, ftp, p2p file sharing, progressive video, etc.) |
| 7 |  | 70 | 100 ms | 10-3 | N/A | N/A | Voice, Video (Live Streaming) Interactive Gaming |
| 8 |  | 80 | 300 ms | 10-6 | N/A | N/A | Video (Buffered Streaming) TCP-based (e.g., www, e-mail, chat, ftp, p2p file sharing, progressive video, etc.) |
| 9 |  | 90 |  |  |  |  |  |

TABLE 1-continued

| 5 QI Value | Resource Type | Default Priority Level | Packet Delay Budget | Packet Error Rate | Default Maximum Data Burst Volume | Default Averaging Window | Example Services |
|---|---|---|---|---|---|---|---|
| 81 | Delay Critical | 11 | 5 ms | 10-5 | 160 B | 2000 ms | Remote control (see TS 22.261 [2]) |
| 82 | GBR | 12 | 10 ms | 10-5 | 320 B | 2000 ms | Intelligent transport systems |

Figure 3:
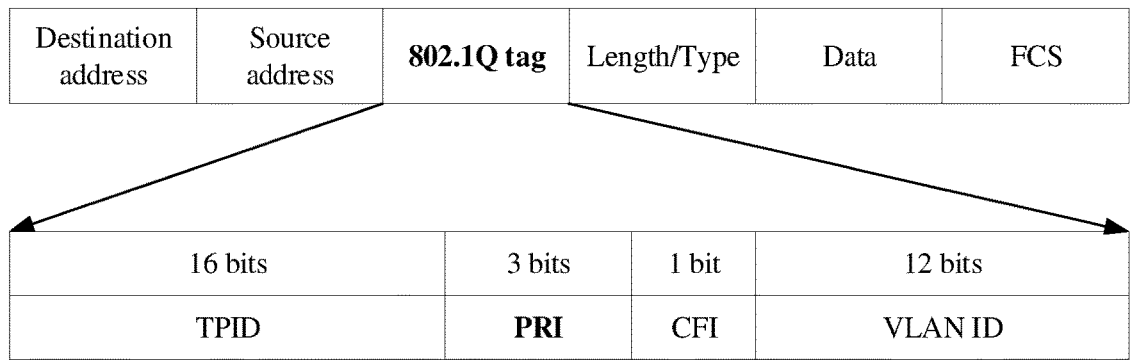
FIG. 3 is a schematic diagram of an example VLAN frame header according to an embodiment of the present disclosure.

2. Differentiated services code point (DSCP) and virtual local area network primary key (VLAN PRI): A transport network (which may also be referred to as a bearer network) is mainly an IP radio access network (IPRAN) or a slicing packet network (SPN). During specific deployment, connection to an access network device and a core network device is performed. A virtual private network (VPN) technology is used at a layer 2 (data link layer) and an IP technology is used at a layer 3 (network layer), and different layers have different QoS parameters. A virtual local area network (VLAN) frame is used between layer 2 devices. As defined in IEEE 802.1Q, a primary key (PRI) field (802.1p priority) or a class of service (CoS) field in a VLAN frame header identifies a quality of service requirement. FIG. 3 shows a location of the PRI field (which may also be referred to a PRI field) in the VLAN frame. The header includes a PRI field of a length of 3 bits in 802.1Q. The PRI field defines eight service priorities CoS whose values are 7, 6, 5, 4, 3, 2, 1, and 0 in descending order of priorities.

Figure 4:
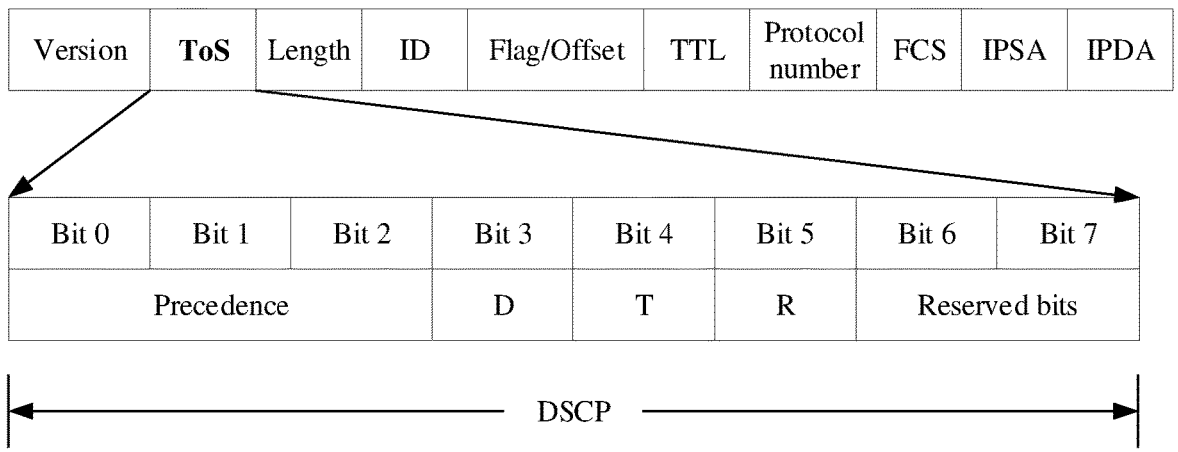
FIG. 4 is a schematic diagram of an example IPv4 packet header according to an embodiment of the present disclosure.

An IP packet is used between layer 3 devices. In RFC 1349, a type of service (ToS) field in the IP packet is redefined and a bit C is added to represent transmission overheads (monetary cost). In RFC 2474, the IETF DiffSery working group redefines bits 0 to 5 in a ToS field in an internet protocol version 4 (IPv4) packet header as a DSCP and renames the ToS field as a differentiated service (DS) field. FIG. 4 shows a location of the DSCP in the packet. In the DS field, the first 6 bits (bits 0 to 5) are used as the DSCP, and the last 2 bits (bits 6 and 7) are reserved bits. The first three bits (bits 0 to 2) in the DS field are a class selector code point (CSCP), and a same CSCP value represents one type of DSCP.

Figure 5:
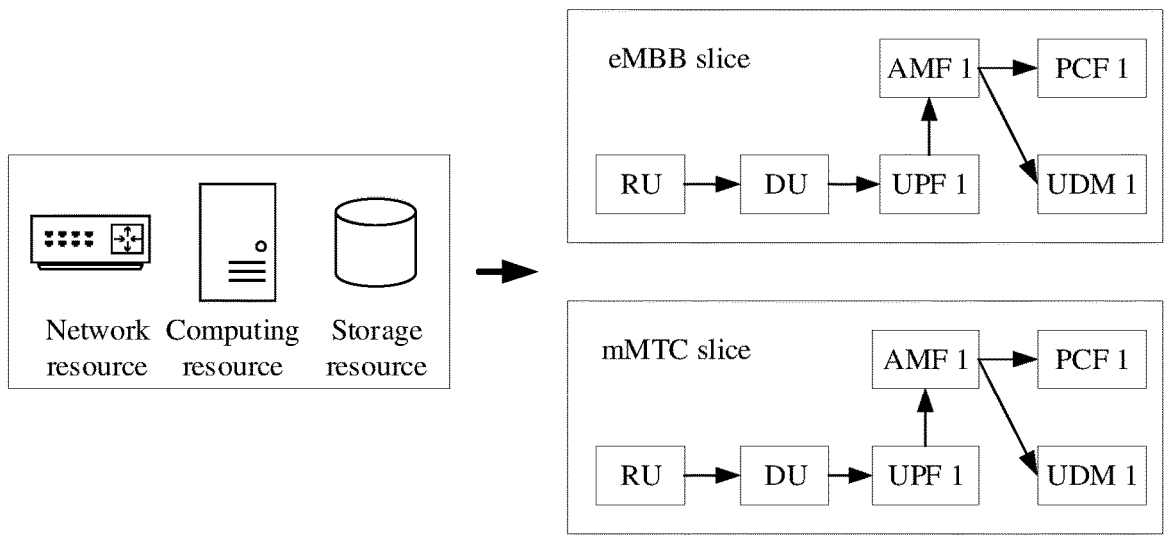
FIG. 5 is a first schematic diagram of an example network slice according to an embodiment of the present disclosure.
Figure 6:
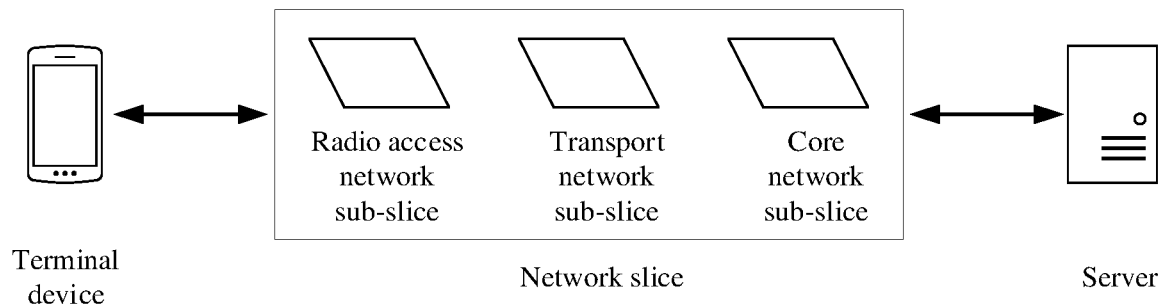
FIG. 6 is a second schematic diagram of an example network slice according to an embodiment of the present disclosure.

(3) Network slicing is an on-demand networking mode allowing an operator to separate a plurality of virtual end-to-end networks on a unified infrastructure, and end-to-end networks may have different network functions to adapt to different types of service requirements. As shown in FIG. 5, the operator may use physical resources to virtualize an eMBB slice network and an mMTC slice network for mass Internet access services. The two slice networks provide services for different service scenarios. Specifically, a network slice is an end-to-end complete logical network. As shown in FIG. 6, each network slice may include a radio access network sub-slice, a transport network sub-slice, and a core network sub-slice, and sub-slices of network slices are logically isolated in the radio access network, the transport network, and then the core network.

(4) Scheduling priority: In a case of congestion, the priority is used to select a service (for example, a QoS flow) to be processed first; and in a case of no congestion, the scheduling priority is used to define resource allocation and scheduling between services.

(5) A transmission delay, also referred to as a packet delay budget (PDB) or a packet delay budget, defines an upper limit of a possible delay time of a packet between an access network device and a mobile network element (termination N6 interface). In the embodiments of the present disclosure, uplink and downlink PDB values of a service may be the same or different. For a same service, different PDB values may be configured for access network devices and/or mobile gateways of different types/at different locations.

(6) A packet error rate (PER) defines an upper limit of a proportion of downlink data packets that fail to be transmitted to an upper layer service instance of an access network device or uplink data packets that fail to be transmitted to an upper layer service instance of a mobile gateway in total transmitted data packets.

(7) Segment routing based on an IPv6 forwarding plane (SRv6) is a protocol designed to forward an IPv6 packet in a network based on a source routing concept. In SRv6, a routing extension header (SRH) is inserted into the IPv6 packet, and an explicit IPv6 address stack is pushed into the SRH, so that hop-by-hop forwarding is completed by continuously updating a destination address and shifting the address stack by an intermediate node. SRv6 is one of key technologies in a 5G TN network.

An SRv6 TE policy is a new tunnel drainage technology developed based on the SRv6 technology. An SRv6 TE policy path is represented as a segment list of a specified path, which is called an SID list (segment ID list). Each SID list is an end-to-end path from a source to a destination and indicates a device in a network to follow a specified path rather than a shortest path calculated by using an interior gateway protocol (IGP). If a packet is imported into the SRv6 TE policy, the SID list is added to the packet by a head end, and remaining devices in the network perform an instruction embedded in the SID list. A packet forwarded on the path meets a QoS constraint corresponding to the tunnel. The SRv6 TE policy includes the following three parts: A head end is a node generated according to the SRv6 TE policy. Color is an extended community attribute carried in the SRv6 TE policy. A tail end (end point) is a destination address in the SRv6 TE policy. The color attribute defines a network SLA policy and may be used to plan a network path based on a service level agreement (SLA). A common parameter set of the color includes bandwidth, a delay, a packet loss rate, jitter, and the like. Each SRv6 TE policy is uniquely identified by a binding SID.

Currently, communication solutions for transmitting a service data packet mainly include the following several solutions:

Solution 1: Each forwarding device in the transport network binds a VLAN PRI/IP DSCP carried in a data packet to a device internal priority, so that the forwarding device can provide differentiated service of quality QoS based on the VLAN PRI/IP DSCP. The device internal priority, also referred to as a local priority, is a priority for differentiating a service class of a data packet in a device. It is generally referred to as a per hop behavior (PHB). RFC defines four types of standard PHBs, which are represented by symbols CS, EF, AF, and BE. Each type of PHB corresponds to one group of DSCPs. During deployment of a mobile communication system, network planning personnel need to plan a mapping relationship between an 5QI and a VLAN PRI/IP DSCP on an access network device and a mobile gateway (for example, a UPF network element) based on a service requirement. When a data packet of a specified type of service passes through the access network device and the mobile gateway, a preset mapping relationship is searched based on a 5QI corresponding to the data packet of this type of service, and a VLAN PRI/IP DSCP field in the data packet is filled in to ensure that the data packet has a required QoS guarantee when the data packet passes through the transport network. The following Table 2 shows a typical mapping relationship:

TABLE 2

| 5QI | DSCP | VLAN PRI |
| --- | --- | --- |
| 1 | 46 | 5 |
| 2 | 26 | 3 |
| 3 | 34 | 4 |
| 4 | 26 | 3 |
| 5 | 46 | 5 |
| 6 | 18 | 2 |
| 7 | 18 | 2 |
| 8 | 10 | 1 |
| 9 | 0 | 0 |

However, a QoS parameter set defined by a 5QI cannot be in a one-to-one correspondence with a QoS parameter defined by a PHB to which the VLAN PRI/IP DSCP is mapped in the forwarding device. Network planning personnel need to perform mapping based on actual experience, and therefore QoS constraints after the mapping are inconsistent. In addition, a service data flow generally passes through one access network device in the access network, a plurality of forwarding devices in the transport network, and one mobile gateway in the core network. Devices in the access network and the core network can guarantee service QoS, but the data flow needs to pass through the plurality of forwarding devices in the transport network. A current QoS mapping mechanism can only constrain a QoS guarantee of each forwarding device in the transport network, and cannot provide a QoS guarantee on an entire forwarding path in the transport network.

Figure 7:
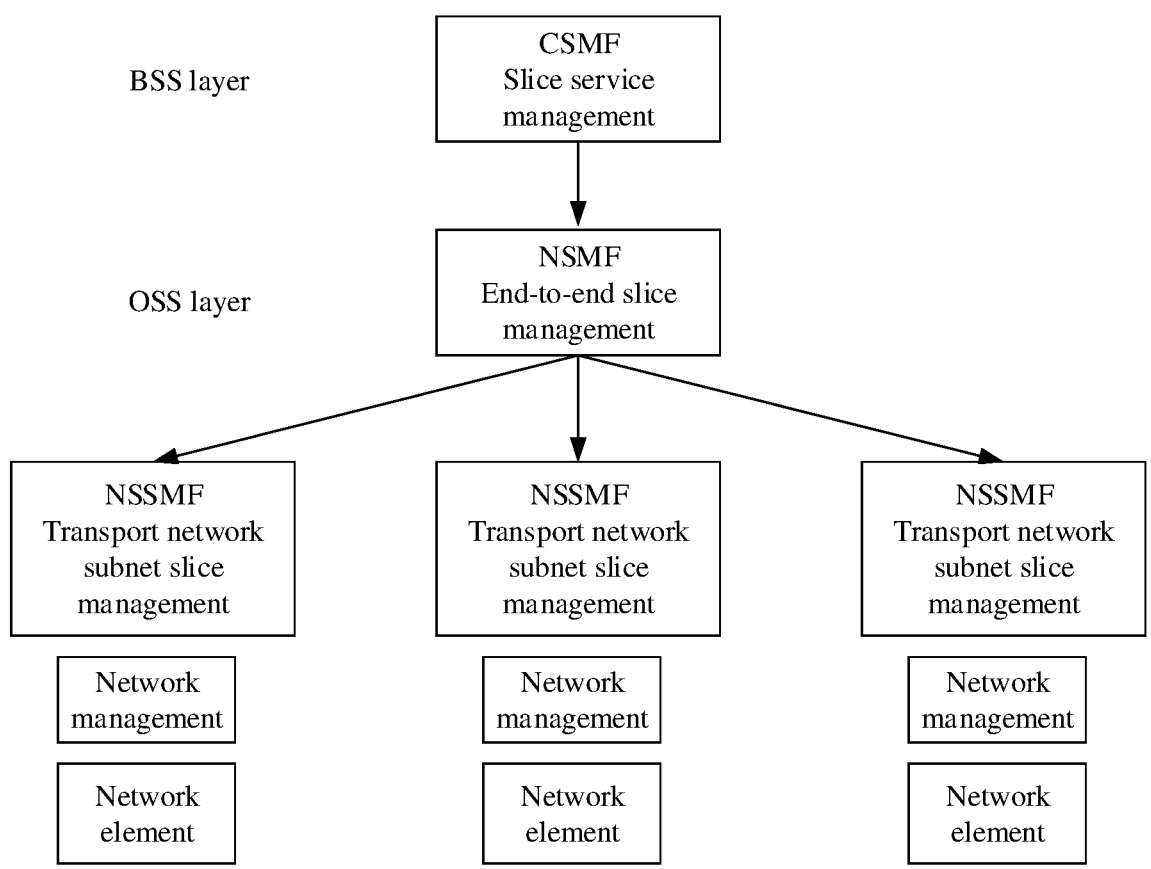
FIG. 7 is a schematic diagram of an example network slice orchestration and management system according to an embodiment of the present disclosure.

Solution 2: In this solution, QoS in the transport network is guaranteed by using a network slicing mechanism. For example, a new unified orchestration and management system is introduced for network slicing to support fast deployment, collaborative work, and life cycle management of slices. The new management system needs to have an on-demand customization capability, an automatic deployment capability, an end-to-end monitoring and collaboration capability, and an intelligent operation and maintenance capability that are of network slicing. As shown in FIG. 7, the protocol specifies that a communication service management function (CSMF), a network slice management function (NSMF), and a network slice subnet management function (NSSMF) constitute a management system, to implement end-to-end network slicing collaboration and life cycle management across the access network, the transport network, and the core network. However, dimensions of a network slice are far beyond a QoS range. The network slice includes dimensions such as device isolation, network-level reliability, and independent operation. For different network slices, a network slice template needs to be planned and designed in advance. Therefore, separate establishment of network slice networks for services having different types of QoS requirements consumes many resources and is more costly. In addition, in a network slice architecture, a transport network subnet slice still provides a QoS guarantee at a network granularity. When there are a plurality of services having different types of QoS requirements in the transport network subnet slice, a service-level QoS guarantee cannot be provided for various services.

Solution 3: The SMF network element needs to select an appropriate UPF network element for a user from a UPF network element set when establishing a user service bearer. The SMF network element may locally configure information about an available UPF network element, or may discover a UPF network element instance from a network function (NF) repository function (NRF) network element. After discovering the UPF network element instance, the SMF network element may consider the following parameters and information for UPF network element selection: dynamic load of the UPF network element, load of the UPF network element analyzed by a network data analytics function (NWDAF), terminal device location information, a relative static capacity between UPF network elements supporting a same DNN, a location of an available UPF network element on the SMF network element, terminal device location information, a PDU session type, a PDU session selection session and service continuity (SSC) mode, and terminal device subscription information in a user data management (UDM) network element, a policy control and charging (PCC) rule, a local operator policy, a slice identifier such as single network slice selection assistance information (S-NSSAI), an access technology that is being used by the terminal device, a user plane topology, and user plane endpoint related information.

However, the parameters for the current SMF network element to select the UPF network element are mainly information that may be collected and configured in the 5G core network, but QoS information of the transport network used by the UPF network element is not referenced. Therefore, in actual selection, one UPF network element may be selected, and a transport network path between the UPF network element and a network device to which the terminal device belongs cannot meet a service QoS requirement of the terminal device.

Through the foregoing analysis, main problems in the solutions in the current technology are as follows: The transport network cannot provide corresponding QoS guarantees for services of different levels based on service-defined QoS requirements in the mobile communication system, and consequently a service cannot obtain an end-to-end QoS guarantee. In solution 1 in the current technology, QoS among the access network, the core network, and the transport network cannot be consistent. In solution 2 in the current technology, a granularity is too large, and a service-level QoS guarantee problem cannot be resolved. In solution 3 in the current technology, a QoS requirement on a service transmission path cannot be guaranteed.

The present disclosure is intended to provide a communication solution, to unify a service QoS definition in an access network, a transport network, and a core network, and provide a QoS guarantee for transmission of a corresponding service data packet in the transport network for services having different QoS requirements based on the definition, thereby providing an end-to-end QoS guarantee for a service in an entire mobile communication system.

In addition, it should be understood that in the present disclosure, "at least one" means one or more, and "a plurality of" means two or more. In addition, "and/or"

describes an association relationship between associated objects, and represents that three relationships may exist. For example, A and/or B may represent any one of the following cases: Only A exists, both A and B exist, or only B exists, where A and B may be singular or plural. In the text descriptions of the present disclosure, the character "/" usually indicates an "or" relationship between associated objects. In addition, unless otherwise stated, ordinal numbers such as "first" and "second" in the embodiments of the present disclosure are used to distinguish between a plurality of objects, but are not intended to limit a sequence, a time sequence, priorities, or importance of the plurality of objects. In addition, descriptions of "first" and "second" do not necessarily indicate that objects are different. Numerals used in the present disclosure are merely used for differentiation for ease of description, but do not limit the scope of the embodiments of the present disclosure. The sequence numbers of the foregoing processes do not mean execution sequences, and the execution sequences of the processes should be determined based on functions and internal logic of the processes. In the present disclosure, the term such as "example" or "for example" is used to represent an example, an illustration, or a description. Any embodiment or design scheme described with "example" or "for example" should not be explained as being more preferred or having more advantages than another embodiment or design scheme. Use of the term such as "example" or "for example" is intended to present a related concept in a specific manner for ease of understanding. The following describes in detail the embodiments of the present disclosure with reference to accompanying drawings.

Figure 8:
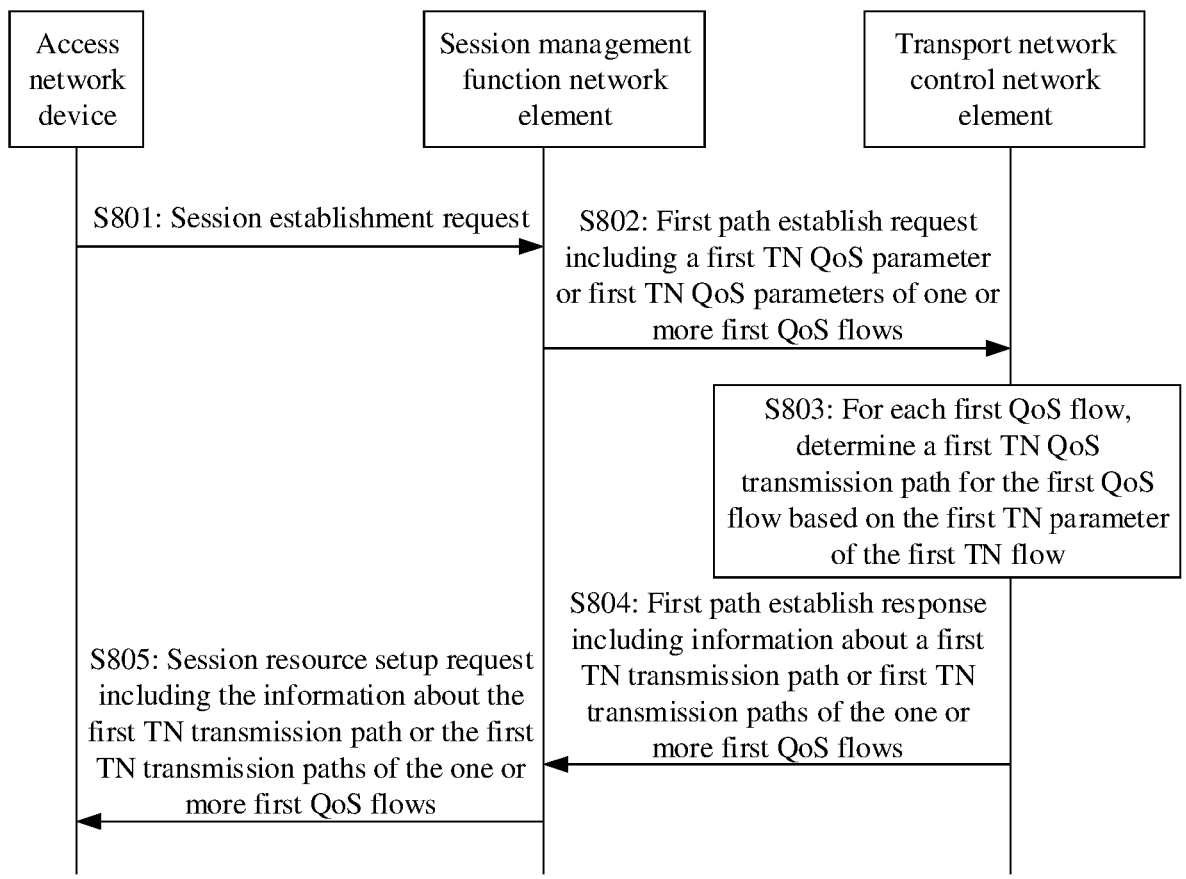
FIG. 8 is a schematic diagram of an example communication method according to an embodiment of the present disclosure.

FIG. 8 is a schematic diagram of a communication method according to an embodiment of the present disclosure. The method includes the following steps.

S801: A session management function network element receives a session establishment request from an access network device, where a session that the session establishment request requests to establish includes one or more first QoS flows.

When an application (for example, a voice call application or a video application) on a terminal device is started, the terminal device is triggered to request to establish a new session (for example, request to establish a new PDU session), to transmit data between the terminal device and a server. Based on different transmission requirements of data between the terminal device and the server, the session that the terminal device requests to establish may include one or more QoS flows, and each QoS flow has a corresponding 5QI, that is, a QoS parameter requirement (for example, a packet delay budget requirement).

In some implementations, after receiving a session establishment request (for example, a PDU session establishment request) from the terminal device, the access network device first forwards (or transparently transmits) the received session establishment request to a mobility management network element (for example, an AMF network element). The mobility management network element selects a session management function network element, and forwards (or transparently transmits) the session establishment request to the selected session management function network element. The session management function network element selects a mobile gateway (for example, a UPF network element) to establish a session for the terminal device.

In an example, the mobility management network element may forward the session establishment request to the session management function network element by using a PDU session create session management (SM) context request (Nsmf PDU session create SM context request), where the PDU session create session management context request carries the session establishment request.

In addition, air interface overheads of different access network devices are different. To ensure that a TN transmission path determined for a QoS flow can provide a QoS guarantee, an identifier of the access network device such as an ID or an IP address of the access network device is carried when the mobility management network element forwards the session establishment request to the session management function network element.

S802: The session management function network element sends a first path establish request to a transport network control network element, and the transport network control network element receives the first path establish request, where the first path establish request includes the identifier of the access network device, an identifier of the mobile gateway selected for the session, and a service instance identifier or service instance identifiers and a first TN QoS parameter or first TN QoS parameters of the one or more first QoS flows.

The first TN QoS parameter of the first QoS flow is determined based on a TN QoS parameter mapped to a first service type of the first QoS flow, the access network device, and the mobile gateway.

In this embodiment, a network management network element may configure a TN QoS parameter of each service, that is, a TN QoS parameter of each QoS flow. In some implementations, each QoS flow may be identified by using <an identifier of an access network device, an identifier of a mobile gateway, and a service type>. A configuration rule may be a mapping rule between an access network device, a mobile gateway, a service type (for example, a 5QI), and a TN QoS parameter. A TN QoS parameter may be obtained by subtracting air interface overheads of a corresponding access network device and a corresponding mobile gateway from an end-to-end QoS parameter corresponding to a service type. The TN QoS parameter may include one or more of a scheduling priority, a transmission delay, a packet error rate, a maximum flow rate, a guaranteed flow rate, and the like.

For example, a TN QoS parameter includes a scheduling priority, a transmission delay, and a packet error rate, and each QoS flow may be identified by using <an identifier of an access network device, an identifier of a mobile gateway, and a service type>. The identifier of the access network device or the identifier of the mobile gateway may be full match. For example, a value 0 represents full match, and it means being applicable to all access network devices or mobile gateways. The TN QoS parameter of each QoS flow in the network management network element may be defined as follows:

1st QoS flow: <0, 0, 1> corresponds to {1, 3 ms, 0.01%}.
2nd QoS flow: <0, 0, 2> corresponds to {3, 100 ms, 0.1%}.
3rd QoS flow: <4, 8, 2> corresponds to {3, 50 ms, 0.1%}.
4th QoS flow: <4, 12, 2> corresponds to {3, 10 ms, 0.1%}.
5th QoS flow: <0, 0, 3> corresponds to {1, 100 ms, 0.1%}.

Taking the 1st QoS flow in which <0, 0, 1> corresponds to {1, 3 ms, 0.01%} as an example, it indicates that a TN QoS parameter that is of a QoS flow whose service type (for example, a 5QI) is 1 and that corresponds to any access network device and any mobile gateway is a scheduling priority 1, a transmission delay 3 ms, and a packet error rate 0.01%.

Figure 9:
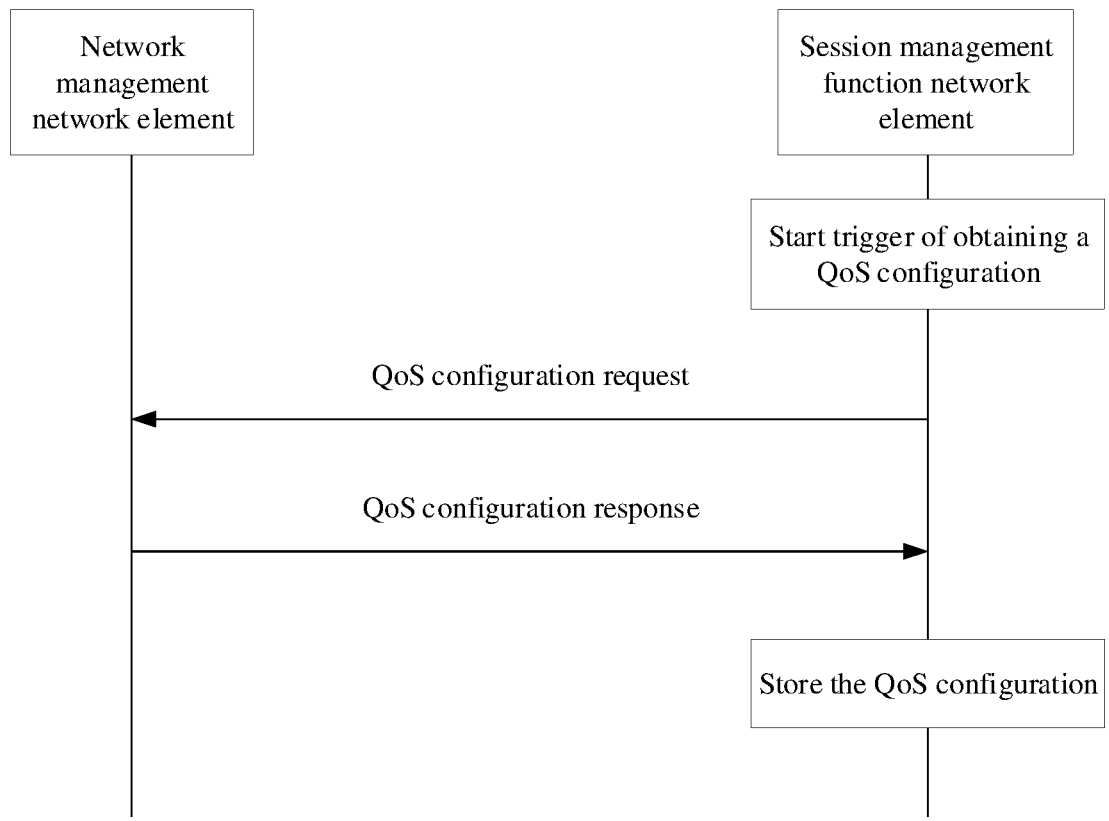
FIG. 9 is a schematic diagram of an example QoS configuration obtaining method according to an embodiment of the present disclosure.

The session management function network element obtains a mapping rule or mapping rules, corresponding to one or more mobile gateways managed by the session management function network element, between a TN QoS parameter, and a service type of a QoS flow, an access network device, and a mobile gateway. In a possible implementation, as shown in FIG. 9, after being started, the session management function network element may send a QoS configuration request to the network management network element, and carry an identifier or identifiers of the one or more managed mobile gateways in the QoS configuration request. After receiving the QoS configuration request from the session management function network element, the network management network element queries, based on the identifier or identifiers of the one or more mobile gateways carried in the QoS configuration request, the mapping rule or the mapping rules, corresponding to the one or more mobile gateways, between a TN QoS parameter, and a service type of a QoS flow, an access network device, and a mobile gateway, and returns the mapping rules to the session management function network element by using a QoS configuration response. The session management function network element stores a QoS configuration carried in the QoS configuration response, that is, stores the mapping rule or the mapping rules, corresponding to the one or more mobile gateways, between a TN QoS parameter, and a service type of a QoS flow, an access network device, and a mobile gateway.

For example, TN QoS parameters of the foregoing five QoS flows are stored in the network management network element. Assuming that an identifier of the session management function network element is 21, three identifiers of mobile network elements managed by the session management function network element are 1, 2, and 8, and the network management network element delivers, to the session management function network element by using the QoS configuration response, a QoS configuration including the 1st QoS flow in which <0, 0, 1> corresponds to {1, 3 ms, 0.01%}, the 2nd QoS flow in which <0, 0, 2> corresponds to {3, 100 ms, 0.1%}, the 3rd QoS flow in which <4, 8, 2> corresponds to {3, 50 ms, 0.1%}, and the 5th QoS flow in which <0, 0, 3> corresponds to {1, 100 ms, 0.1%}.

It should be understood that, if there is more content in the QoS configuration, the network management network element may alternatively send the QoS configuration to the session management function network element by using a plurality of QoS configuration responses, and mark that there is a subsequent QoS configuration response in a first QoS configuration response, and mark that there is no subsequent QoS configuration response in a last QoS configuration response.

In addition, when a managed mobile gateway is newly added, the session management function network element may separately obtain a mapping rule, corresponding to the newly added mobile gateway, between a TN QoS parameter and a service type of a QoS flow, an access network device, and a mobile gateway from the network management network element, and carry only an identifier of the newly added mobile gateway in the QoS configuration request.

Figure 10:
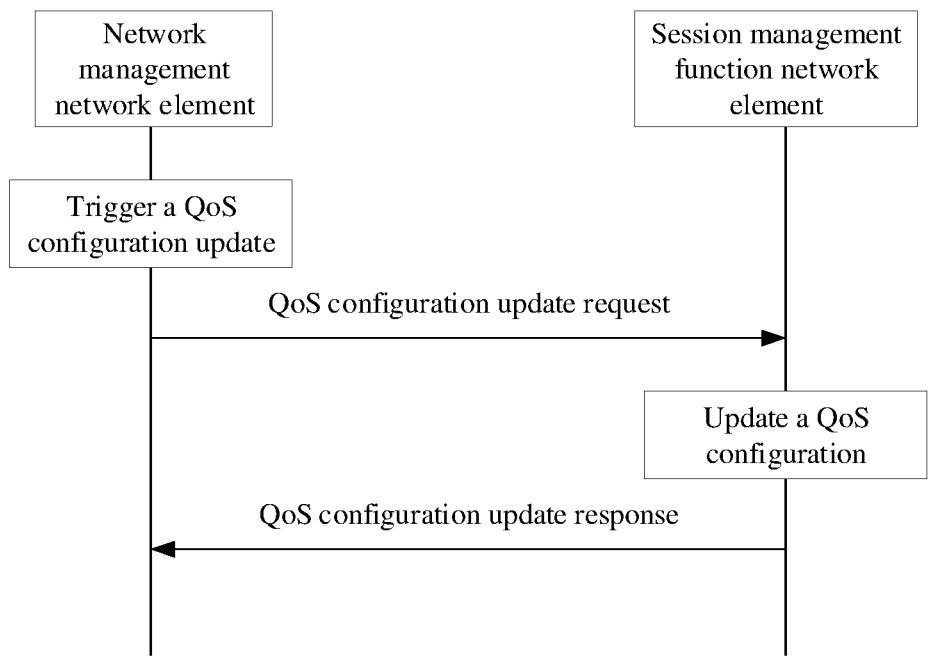
FIG. 10 is a schematic diagram of an example QoS configuration update method according to an embodiment of the present disclosure.

In addition, as shown in FIG. 10, when some or all mapping rules, configured in the network management network element, between a TN QoS parameter, and a service type of QoS flows, an access network device, and a mobile gateway change, the session management function network element that focuses on a changed mapping rule needs to be notified in time. The network management network element may send a QoS configuration update request (for example, a service QoS config update request) to the session management function network element, and send change information about a changed mapping rule between a TN QoS parameter and a service type of a QoS flow, an access network device, and a mobile gateway to the session management function network element. After receiving the QoS configuration update request, the session management function network element updates the changed mapping rule, in the stored QoS configuration, between a TN QoS parameter and a service type of a QoS flow, an access network device, and a mobile gateway, and may return a QoS configuration update response (for example, a service QoS update response) to the network management network element, to notify the network management network element that a QoS configuration update is completed.

In an example, a correspondence that is between <0, 0, 3> and {1, 100 ms, 0.1%} and that is configured in the network management network element changes and is updated to a correspondence between <0, 0, 3> and {2, 100 ms, 0.1%}, and the correspondence between <0, 0, 3> and {1, 100 ms, 0.1%} is stored in the session management function network element. The network management network element may send, to the session management function network element, a QoS configuration update carrying information indicating to update the correspondence between <0, 0, 3> and {1, 100 ms, 0.1%} to the correspondence between <0, 0, 3> and {2, 100 ms, 0.1%}, and requests the correspondence that is between <0, 0, 3> and {1, 100 ms, 0.1%} and that is updated and stored in the session management function network element. The session management function network element receives the QoS configuration update request, updates the correspondence between <0, 0, 3> and {1, 100 ms, 0.1%} to the correspondence between <0, 0, 3> and {2, 100 ms, 0.1%}, and may return a QoS configuration update response to the network management network element, to complete a QoS configuration update.

Specifically, after receiving the session establishment request, the session management function network element selects the mobile gateway for the session, determines a first TN QoS parameter of each first QoS flow in the session based on the access network device, the mobile gateway selected for the session, and a service type (for example, a 5QI) of each first QoS flow in the session that is requested to be established, and sends, to the transport network controller, the first path establish request including the identifier of the access network device, the identifier of the mobile gateway, and the service instance identifier or the service instance identifiers and the first TN QoS parameter or the first TN QoS parameters of the one or more first QoS flows, to request the transport network control network element to configure a TN transmission path for each first QoS flow.

In a possible implementation, when selecting the mobile gateway for the session, the session management function network element may consider whether a TN transmission path or TN transmission paths that meet the first TN QoS parameter or the first TN QoS parameters of the one or more first QoS flows can be established between the access network device and the mobile gateway. For example, the session management function network element may first select, from a managed mobile gateway set, a mobile gateway subset corresponding to an access point name (APN) to which the session belongs; select, from a selected mobile gateway set, a mobile gateway subset supporting a slice in which the session is located; select, from the selected mobile gateway set, a mobile gateway subset supporting an access network device in which the session is located; then find, as an optional subset from the selected mobile gateway set, a mobile gateway or mobile gateways whose TN transmission path or TN transmission paths meet the first TN QoS parameter or the first TN QoS parameters of the one or more first QoS flows in the session; and finally, select one mobile gateway from the selected mobile gateway set as a serving mobile gateway based on a load and a weight of the mobile gateway. In addition, the first path establish request may carry information about one or more TN transmission paths that are corresponding to the mobile gateway and that meet the first TN QoS parameter or the first TN QoS parameters of the one or more first QoS flows in the session.

In another possible implementation, when selecting the mobile gateway for the session, the session management function network element may alternatively not consider whether a TN transmission path or TN transmission paths that meet the first TN QoS parameter or the first TN QoS parameters of the one or more first QoS flows can be established between the access network device and the mobile gateway. For example, the session management function network element directly selects, based on a server corresponding to the session, a mobile gateway associated with the server, or selects a mobile gateway supporting a slice in which the session is located.

S803: For each of the one or more first QoS flows, the transport network control network element determines a first TN transmission path between the access network device and the mobile gateway for the first QoS flow based on a first TN QoS parameter of the first QoS flow.

The transport network control network element may obtain QoS information (including but not limited to a transmission delay, a packet error rate, jitter, transmission bandwidth, a packet loss rate, and the like) between adjacent forwarding devices from forwarding devices in the transport network, and calculate, based on the QoS information between the adjacent forwarding devices, a TN transmission path that is between the specified access network device and the mobile gateway and that meets a TN QoS parameter in a specific condition.

In an example, the terminal device is registered with an access network device 1, the session that is requested to be established includes a QoS flow 1 and a QoS flow 2 respectively corresponding to service types (for example, 5QIs) 1 and 2, the identifier of the mobile gateway selected by the session management function network element for the session is 8, and it is determined that a TN QoS parameter 1 corresponding to the QoS flow 1 is {1, 3 ms, 0.01%} and a TN QoS parameter 2 corresponding to the QoS flow 2 is {3, 100 ms, 0.1%}. After the transport network control network element receives the first path establish request that is sent by the session management function network element and that includes the identifier 1 of the access network device, the identifier 8 of the mobile gateway, {QoS flow 1, 5QI=1, TN QoS parameter 1}, and {QoS flow 2, 5QI=2, TN QoS parameter 2}, the transport network control network element calculates, for the QoS flow 1 based on the TN QoS parameter 1 of the QoS flow 1, a TN transmission path that is between the access network device 1 and the mobile gateway 8 and that meets the TN QoS parameter 1, and calculates, for the QoS flow 2, a TN transmission path that is between the access network device 1 and the mobile gateway 8 and that meets the TN QoS parameter 2.

In addition, if the first path establish request further carries information about a TN transmission path, the transport network control network element may further adjust the TN transmission path for the first QoS flow, to enable the TN transmission path to meet the first TN QoS parameter requirement of the first QoS flow. If the requirement cannot be met, a new path that meets the first TN QoS parameter requirement is re-established.

To facilitate the transport network control network element to calculate a TN transmission path between the access network device and the mobile gateway, the access network device and/or the mobile gateway may report transport layer information of a device (or a network element) to the transport network control network element after being started or periodically.

Figure 11:
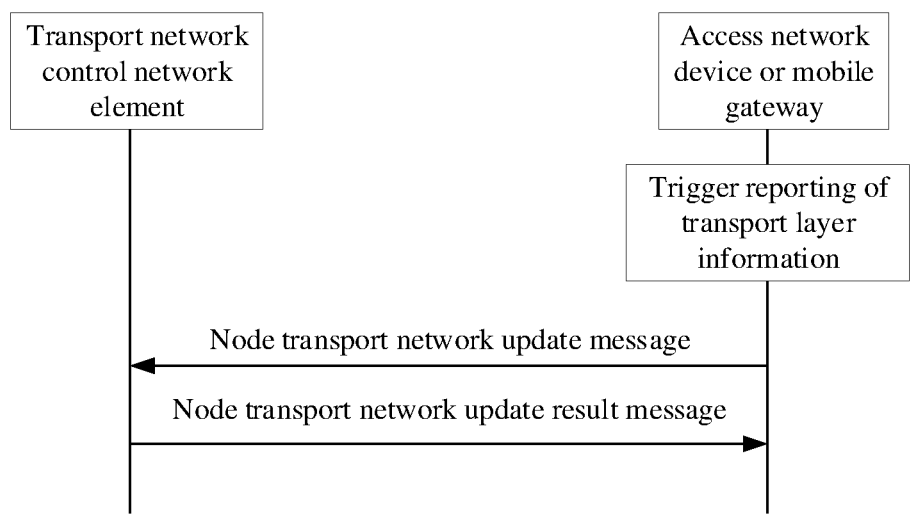
FIG. 11 is a schematic diagram of an example transport layer information reporting method according to an embodiment of the present disclosure.

As shown in FIG. 11, the access network device or the mobile gateway may send a node transport network update message (for example, a node TN info update message) to the transport network control network element based on a specified period, where the message carries a device type, a device identifier, and transport layer information (for example, a transport interface SRv6 ID address and a transport interface VLAN). After receiving the node transport network update message, the transport network control network element stores transport layer information of the access network device or the mobile gateway, and may return a node transport network update result message (for example, a node TN info update result message) to the access network device or the mobile gateway, where the message carries a reception success identifier.

For example, an SRv6 address SID is a transport layer interface identifier of the access network device or the mobile gateway. The transport network control network element may collect a network topology and an SID of a mobile communication system by using a border gateway protocol (BGP) link state (LS) and a mapping relationship between an SID of the access network device and an SID of the mobile gateway. Therefore, the node transport network update message may be a BGP packet. An SRv6 network layer reachability information (NLRI) field may be extended in the BGP packet, and the field includes a type and an identifier of the access network device or the mobile gateway.

The type of the access network device may be set to 1, and the identifier may be set to an access network device ID defined in the 3GPP protocol; and the type of the mobile gateway may be set to 2, and the identifier may be set to a mobile gateway ID defined in the 3GPP protocol.

Assuming that the access network device ID is 1 and the corresponding SRv6 SID is 2000::1; and the mobile gateway ID is 8 and the corresponding SRv6 SID is 2000::8. After the access network device and the mobile gateway are started, mapping relationships {1, 1, 2000::1} and {2, 8, 2000::8} between logical IDs and transport layer IDs of the two network elements are reported to the transport network controller by using the BGP packet. The transport network controller establishes a mapping relationship between the mobile gateway ID/access network device ID and a respective underlying SRv6 SID.

In a possible implementation, to ensure accuracy of the mapping relationship that is between the mobile gateway ID/access network device ID and the respective underlying SRv6 SID and that is stored by the transport network controller, the transport network controller may set a storage period of the stored mapping relationship between the mobile gateway ID/access network device ID and the respective underlying SRv6 SID, and the mapping relationship is no longer stored once the storage period expires.

S804: The transport network control network element sends a first path establish response to the session management function network element, and the session management function network element receives the first path establish response, where the first path establish response includes the service instance identifier or the service instance identifiers of the one or more first QoS flows and information about a first TN transmission path or first TN transmission paths.

S805: The session management function network element sends a session resource setup request to the access network device, where the session resource setup request includes the service instance identifier or the service instance identifiers of the one or more first QoS flows and the information about the first TN transmission path or the first TN transmission paths.

After obtaining the service instance identifier or the service instance identifiers of the one or more first QoS flows and the information about the first TN transmission path or the first TN transmission paths based on the first path establish response from the transport network control network element, the session management function network element may send the information about the first TN transmission path or the first TN transmission paths of the one or more first QoS flows to the access network device by carrying the service instance identifier or the service instance identifiers of the one or more first QoS flows and the information about the first TN transmission path or the first TN transmission paths in the session resource setup request that is transparently transmitted by the mobility management network element to the access network device.

In addition, to facilitate the mobile gateway to learn of the information about the first TN transmission path or the first TN transmission paths of the one or more first QoS flows in the session, after receiving the first path establish response from the transport network control network element, the session management function network element may further send a first N4 session establishment request (for example, an N4 session modify request) to the mobile gateway, so that the mobile gateway is notified of the information about the first TN transmission path or the first TN transmission paths of the one or more first QoS flows by using the first N4 session establishment request carrying the service instance identifier or the service instance identifiers of the one or more first QoS flows and the information about the first TN transmission path or the first TN transmission paths. N4 is an interface between the mobile gateway and the session management function network element, and may be used to transmit control plane information between the mobile gateway and the session management function network element.

The access network device and the mobile gateway may forward a received uplink data packet or downlink data packet based on the information about the first TN transmission path or the first TN transmission paths of the one or more first QoS flows in the session.

Figure 12:
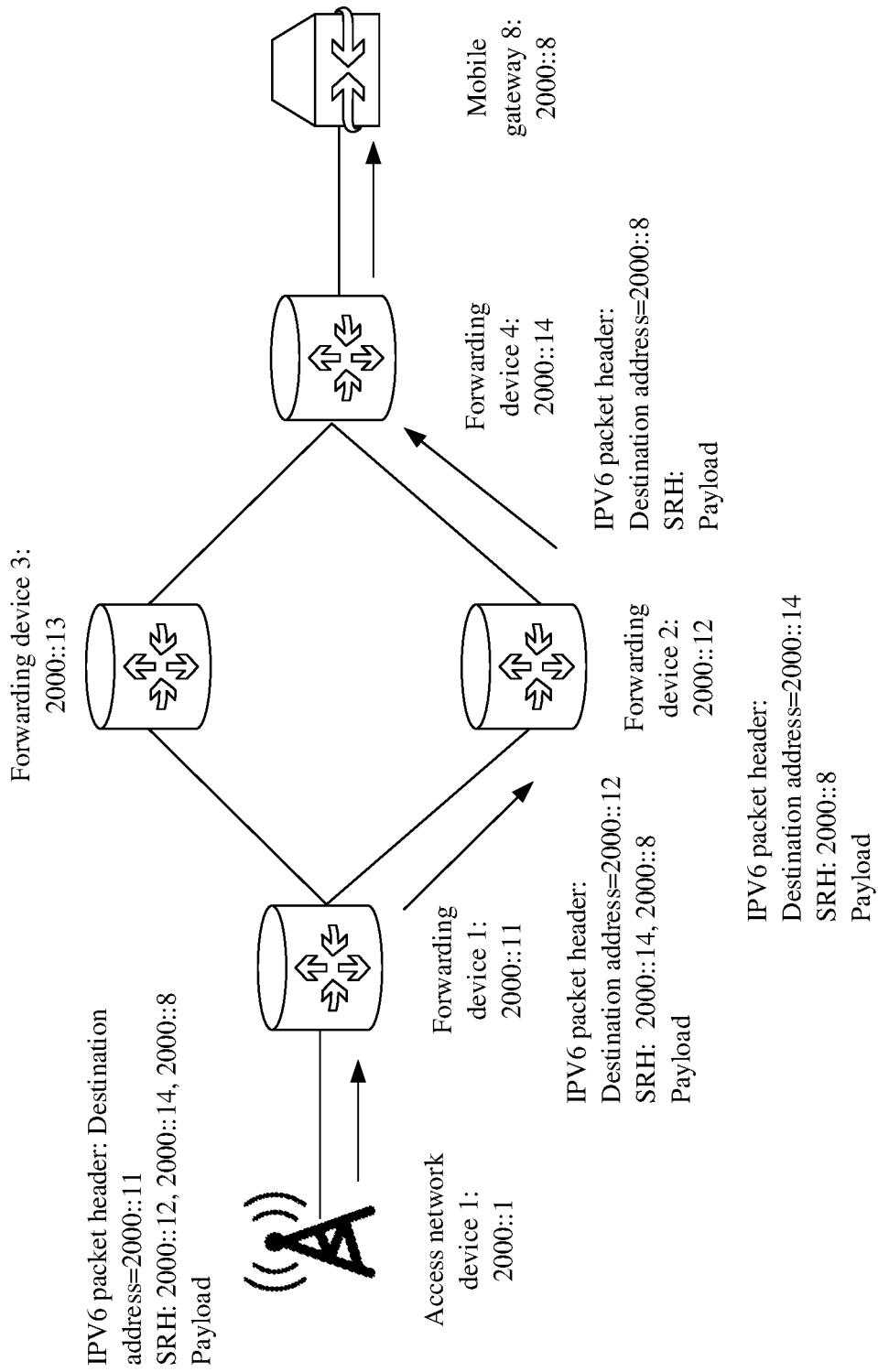
FIG. 12 is an example schematic diagram of data packet forwarding according to an embodiment of the present disclosure.

In a possible implementation, the information about the first TN transmission path may be specific routing information of the transmission path. As shown in FIG. 12, there are two TN transmission paths from an access network device 1 to a mobile gateway 8, a TN transmission path corresponding to a QoS flow 1 is shown by an arrow, a corresponding path identifier is a Bingding ID 11, and corresponding routing information is: a head node: 2000::1, a tail node: 2000::8, and an SID list: 2000::11, 2000::12, 2000::14.

For example, a transport network uses an Srv6 protocol, routing information is a path node list, and an encapsulation format is an SRH format. When sending a data packet of the QoS flow 1 from the terminal device, the access network device 1 sets a source address in an IP HDR to 2000::1, sets a destination (dst) address to a next-hop node 2000::11, and sets an SID list in an SRH (SRv6 HDR) to 2000::12, 2000::14, and a destination address 2000::8, and then performs IP routing and forwarding.

After the data packet is forwarded to a forwarding device 1, according to an SRv6 forwarding rule, a Dst address in an IP header of a data packet sent by a current node is set to a latest address 2000::12 in an SRH header, and IP routing and forwarding are performed.

After the data packet is forwarded to a forwarding device 2, according to the SRv6 forwarding rule, the Dst address in the IP header of the data packet sent by the current node is set to a latest address 2000::14 in the SRH header, and IP routing and forwarding are performed. After the data packet is forwarded to a forwarding device 14, according to the SRv6 forwarding rule, the Dst address in the IP header of the data packet sent by the current node is set to a latest address 2000::8 in the SRH header, and IP routing and forwarding are performed.

After the data packet is forwarded to the mobile gateway 8, if it is found that a target address is consistent with an address of the current node, the data packet is no longer forwarded, and is submitted to an upper-layer protocol for processing.

In another possible implementation, the information about the first TN transmission path may be alternatively a path identifier (for example, a Bingding ID). If the information about the first TN transmission path is a path identifier, the transport network control network element further needs to deliver the path identifier and corresponding specific routing information to the access network device and the mobile gateway.

Figure 13:
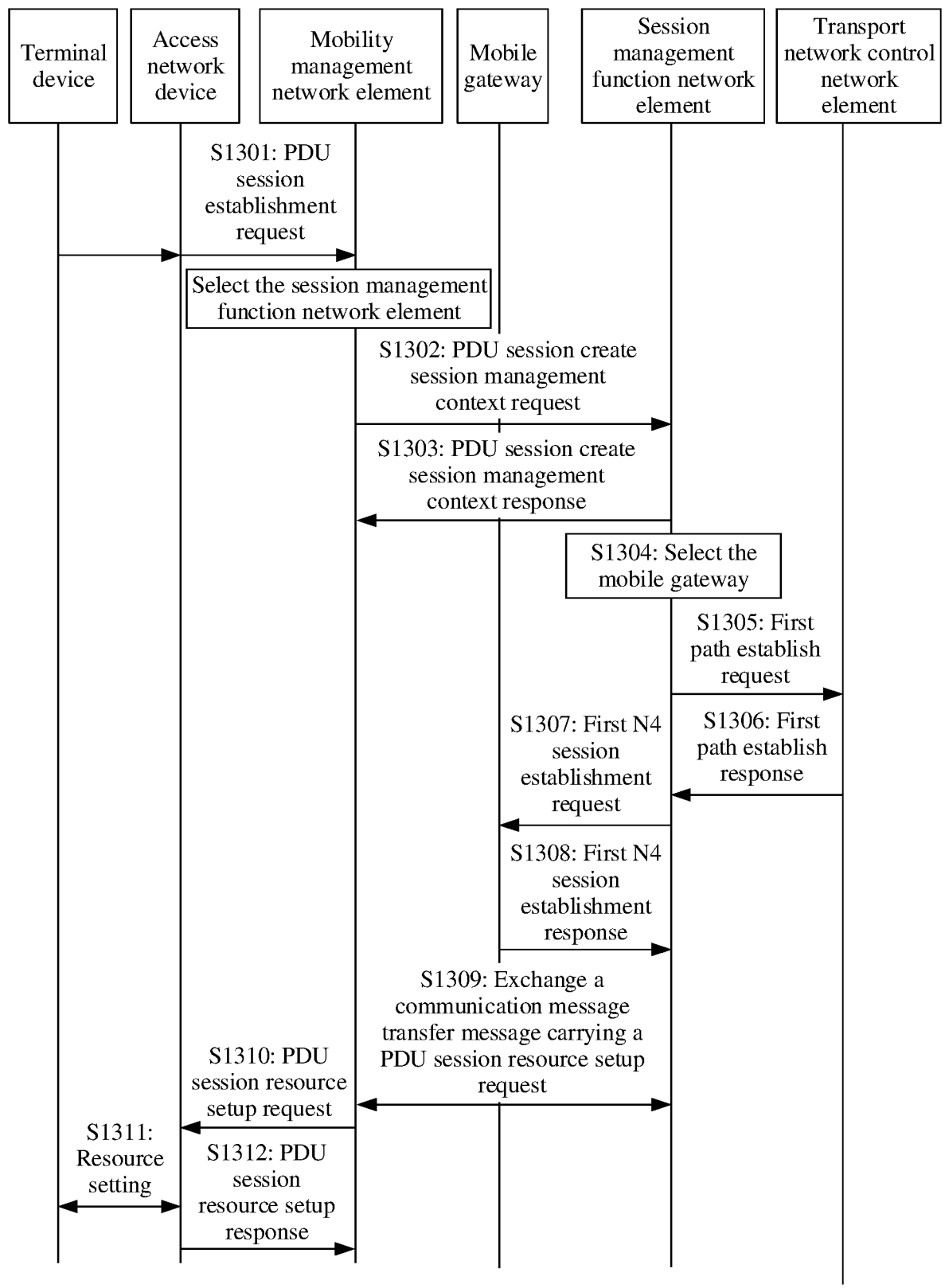
FIG. 13 is a schematic diagram of an example PDU session establishment method according to an embodiment of the present disclosure.

A PDU session is used as an example. FIG. 13 is a schematic diagram of an example PDU session establishment method. The method includes the following steps.

S1301: An access network device forwards a PDU session create request (for example, a PDU session establishment request) from a terminal device to a mobility management network element.

A session that a session establishment request requests to establish includes one or more first QoS flows.

S1302: The mobility management network element sends a PDU session create session management context request (for example, an Nsmf PDU session_create SM context request) to a selected session management function network element, and carries an identifier of the access network device and the PDU session create request in the PDU session create session management context request.

S1303: The session management function network element sends a PDU session create session management context response (for example, an Nsmf PDU session_create SM context response) to the mobility management network element.

S1304: The session management function network element selects a mobile gateway.

S1305: The session management function network element sends a first path establish request (for example, a service path establish request) to a transport network control network element.

The first path establish request includes the identifier of the access network device, an identifier of the mobile gateway, and a service instance identifier or service instance identifiers and a first TN QoS parameter or first TN QoS parameters of the one or more first QoS flows.

S1306: The transport network control network element sends a first path establish response (for example, a service path establish response) to the session management function network element.

The first path establish response includes the service instance identifier or the service instance identifiers that are of the one or more QoS flows and information about a first TN transmission path or first TN transmission paths.

S1307: The session management function network element sends a first N4 session establishment request (for example, an N4 session modify request) to the mobile gateway.

The first N4 session establishment request includes the service instance identifier or the service instance identifiers of the one or more first QoS flows and the information about the first TN transmission path or the first TN transmission paths.

S1308: The mobile gateway sends a first N4 session establishment response (for example, an N4 session establishment response) to the session management function network element.

S1309: The session management function network element exchanges a communication message transfer message (for example, an Namf_communication_N1N2 message transfer message) with the mobility management network element.

The communication message transfer message carries a PDU session resource setup request (for example, an N2 PDU session resource setup request).

The PDU session resource setup request includes the service instance identifier or the service instance identifiers of the one or more first QoS flows and the information about the first TN transmission path or the first TN transmission paths.

S1310: The mobility management network element sends the PDU session resource setup request to the access network device.

S1311: The access network device and the terminal device perform resource setting, where the access network device sends a PDU session establishment accept (for example, a PDU session establishment accept) message to the terminal device.

S1312: The access network device sends a PDU session resource setup response (for example, an N2 PDU session resource setup response) to the mobility management function network element.

After the PDU session is established, the access network device and the mobile gateway may forward a received uplink data packet or downlink data packet based on the information about the first TN transmission path or the first TN transmission paths of the one or more first QoS flows in the session.

In a session process, the terminal device may need to add a QoS flow in the session, modify a QoS flow in the session, and delete a QoS flow in the session. The following provides descriptions with reference to specific requirement scenarios.

Scenario 1: A QoS flow is added to a session.

Figure 14:
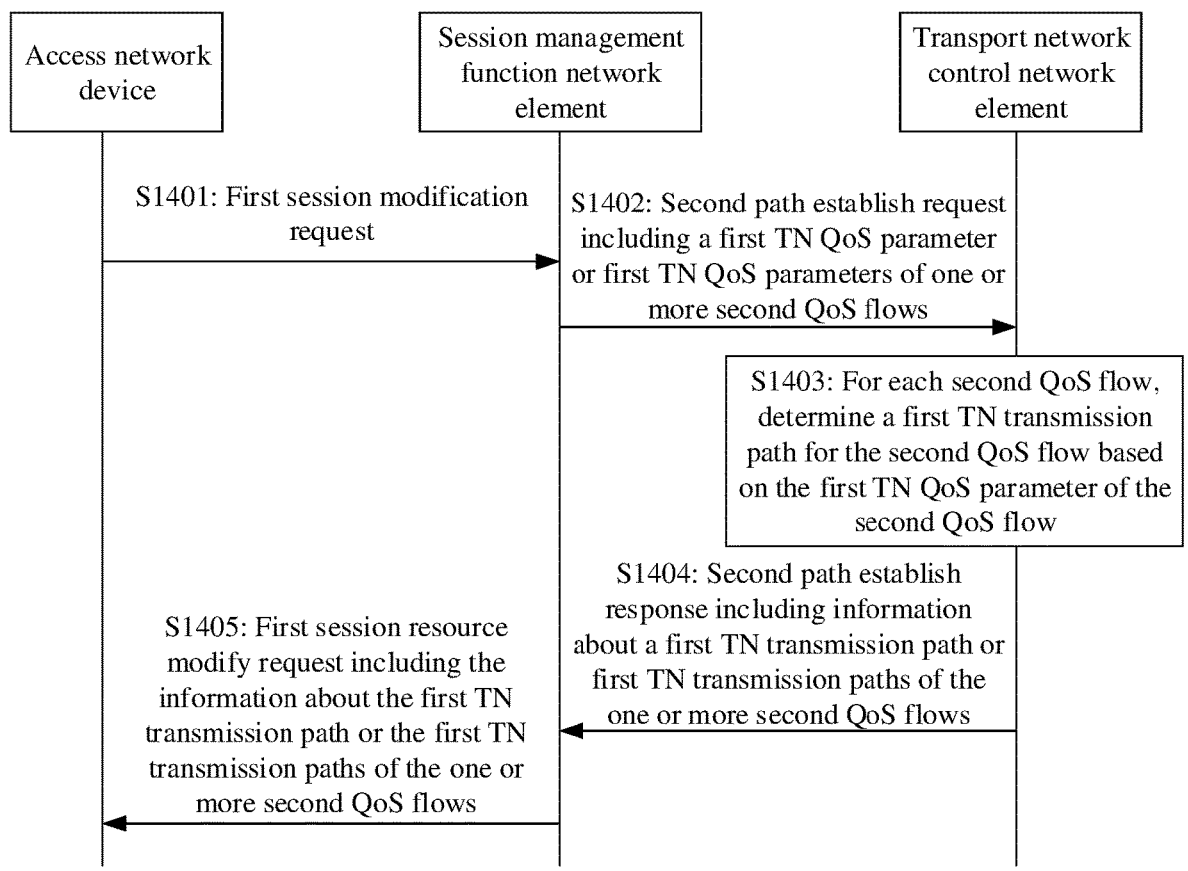
FIG. 14 is a schematic diagram of an example method for adding a QoS flow to a session according to an embodiment of the present disclosure.

FIG. 14 shows an example method for adding a QoS flow to a session according to an embodiment of the present disclosure. The method includes the following steps.

S1401: A session management function network element receives a first session modification request from an access network device.

The first session modification request is from a terminal device and requests to establish one or more second QoS flows in the session.

In some implementations, the first session modification request (for example, a PDU session modification request) that is from the terminal device and that is forwarded by the access network device may be forwarded by a mobility management network element to the session management function network element for processing.

In an example, the mobility management network element may forward the first session modification request to the session management function network element by using a PDU session update session management context request (for example, an Nsmf PDU session update SM context request), where the PDU session update session management context request carries the first session modification request.

S1402: The session management function network element sends a second path establish request to a transport network control network element, and the transport network control network element receives the second path establish request, where the second path establish request includes an identifier of the access network device, an identifier of a mobile gateway, and a service instance identifier or service instance identifiers and a first TN QoS parameter or first TN QoS parameters of the one or more second QoS flows.

The first TN QoS parameter of the second QoS flow is determined based on a TN QoS parameter mapped to a first service type of the second QoS flow, the access network device, and the mobile gateway.

S1403: For each of the one or more second QoS flows, the transport network control network element determines a first TN transmission path between the access network device and the mobile gateway for the second QoS flow based on the first TN QoS parameter of the second QoS flow.

S1404: The transport network control network element sends a second path establish response to the session management function network element, where the second path establish response includes the service instance identifier or the service instance identifiers of the one or more second QoS flows and information about a first TN transmission path or first TN transmission paths.

Implementation principles of steps S1402 to S1404 are similar to those of steps S802 to S804. For details, refer to the implementations of steps S802 to S804.

S1405: The session management function network element sends a first session resource modify request to the access network device, where the first session resource modify request includes the service instance identifier or the service instance identifiers of the one or more second QoS flows and the information about the first TN transmission path or the first TN transmission paths.

In an example, after receiving the second path establish response from the transport network control network element, the session management function network element may carry the service instance identifier or the service instance identifiers of the one or more second QoS flows and the information about the first TN transmission path or the first TN transmission paths in the first session resource modify request that is transparently transmitted to the access network device by using the mobility management network element.

In addition, to facilitate the mobile gateway to learn of the information about the first TN transmission path or the first TN transmission paths of the one or more second QoS flows in the session, after receiving the second path establish response from the transport network control network element, the session management function network element may send a second N4 session establishment request to the mobile gateway, where the second N4 session establishment request includes the service instance identifier or the service instance identifiers of the one or more second QoS flows and the information about the first TN transmission path or the first TN transmission paths.

The access network device and the mobile gateway may forward data packets of the one or more second QoS flows based on the information about the first TN transmission path or the first TN transmission paths of the one or more second QoS flows in the session.

Scenario 2: A QoS flow in a session is modified.

Figure 15:
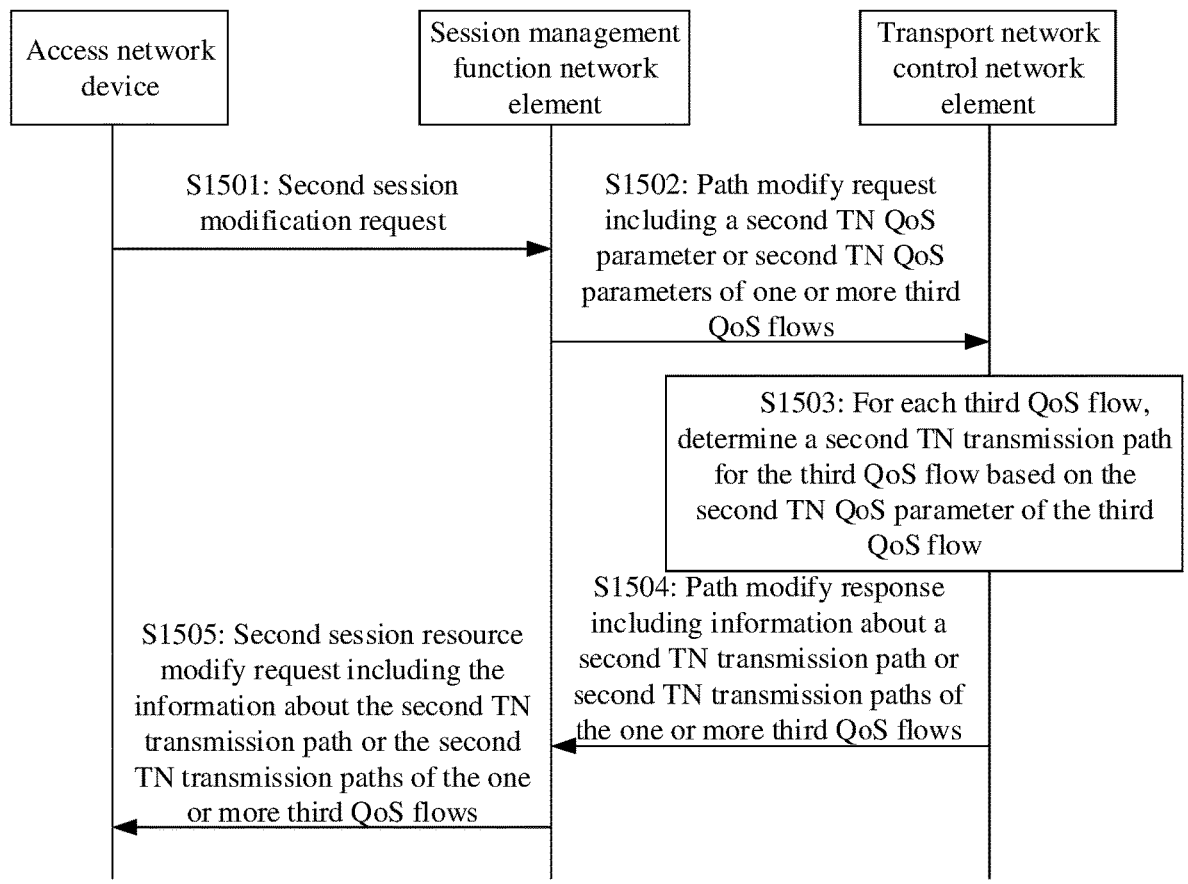
FIG. 15 is a schematic diagram of an example method for modifying a QoS flow in a session according to an embodiment of the present disclosure.

FIG. 15 shows an example method for modifying a QoS flow in a session according to an embodiment of the present disclosure. The method includes the following steps.

S1501: A session management function network element receives a second session modification request from an access network device.

The second session modification request is from a terminal device and requests to modify one or more third QoS flows in the session.

In an example, the session includes a QoS flow 1 and a QoS flow 2, a 5QI of the QoS flow 1 is 1, and a 5QI of the QoS flow 2 is 2. When the terminal device modifies the 5QI of the QoS flow 2 from 2 to 3, that is, modifies a service type of the QoS flow 2 from a first service type (5QI=2) to a second service type (5QI=3), the terminal device sends, to the access network device, the second session modification request carrying information indicating that the service type of the QoS flow 2 is modified from the first service type (5QI=2) to the second service type (5QI=3).

S1502: The session management function network element sends a path modify request to a transport network control network element, and the transport network control network element receives the path modify request, where the path modify request includes a service instance identifier or service instance identifiers and a second TN QoS parameter or second TN QoS parameters of the one or more third QoS flows.

The second TN QoS parameter of the third QoS flow is determined based on a TN QoS parameter mapped to a second service type of the third QoS flow, the access network device, and a mobile gateway.

S1503: For each of the one or more third QoS flows, the transport network control network element determines a second TN transmission path between the access network device and the mobile gateway for the third QoS flow based on the second TN QoS parameter of the third QoS flow.

If a service type of a QoS flow changes, a TN QoS parameter of the QoS flow changes. For a third QoS flow whose service type changes, the session management function network element may re-determine a TN QoS parameter of the third QoS flow based on a TN QoS parameter mapped to a second service type of the third QoS flow, the access network device, and the mobile gateway.

Similarly, for the third QoS flow whose service type changes, the transport network control network element may recalculate, for the third QoS flow based on a new TN QoS parameter (a second TN QoS parameter) of the third QoS flow, a second TN transmission path that is between the access network device and the mobile gateway and that meets a new TN QoS parameter requirement.

When recalculating, for the third QoS flow, the second TN transmission path that meets the new TN QoS parameter requirement, the transport network control network element may first adjust an original first TN transmission path of the third QoS flow to obtain the second TN transmission path that meets the new TN QoS parameter requirement, or may directly delete an original first TN transmission path of the third QoS flow and establish the second TN transmission path that meets the new TN QoS parameter requirement. This is not limited in embodiment of the present disclosure.

In an example, the path modify request received by the transport network control network element includes: an identifier 1 of the access network device, an identifier 8 of the mobile gateway, and {QoS flow 2, 5QI=3, TN QoS parameter 2'}, where the TN QoS parameter 2' is {1, 100 ms, 0.1%}. The transport network control network element recalculates, for the QoS flow 2, a TN transmission path that is between the access network device 1 and the mobile gateway 8 and that meets {1, 100 ms, 0.1%}.

S1504: The transport network control network element sends a path modify response to the session management function network element, and the session management function network element receives the path modify response, where the path modify response includes the service instance identifier or the service instance identifiers of the one or more third QoS flows and information about a second TN transmission path or second TN transmission paths.

S1505: The session management function network element sends a second session resource modify request to the access network device, where the second session resource modify request includes the service instance identifier or the service instance identifiers of the one or more third QoS flows and the information about the second TN transmission path or the second TN transmission paths.

In addition, to facilitate the mobile gateway to learn of the information about the second TN transmission path or the second TN transmission paths of the one or more third QoS flows in the session, after receiving the path modify response from the transport network control network element, the session management function network element may send an N4 session modification request to the mobile gateway, where the N4 session modification request includes the service instance identifier or the service instance identifiers of the one or more third QoS flows and the information about the second TN transmission path or the second TN transmission paths.

Figure 16:
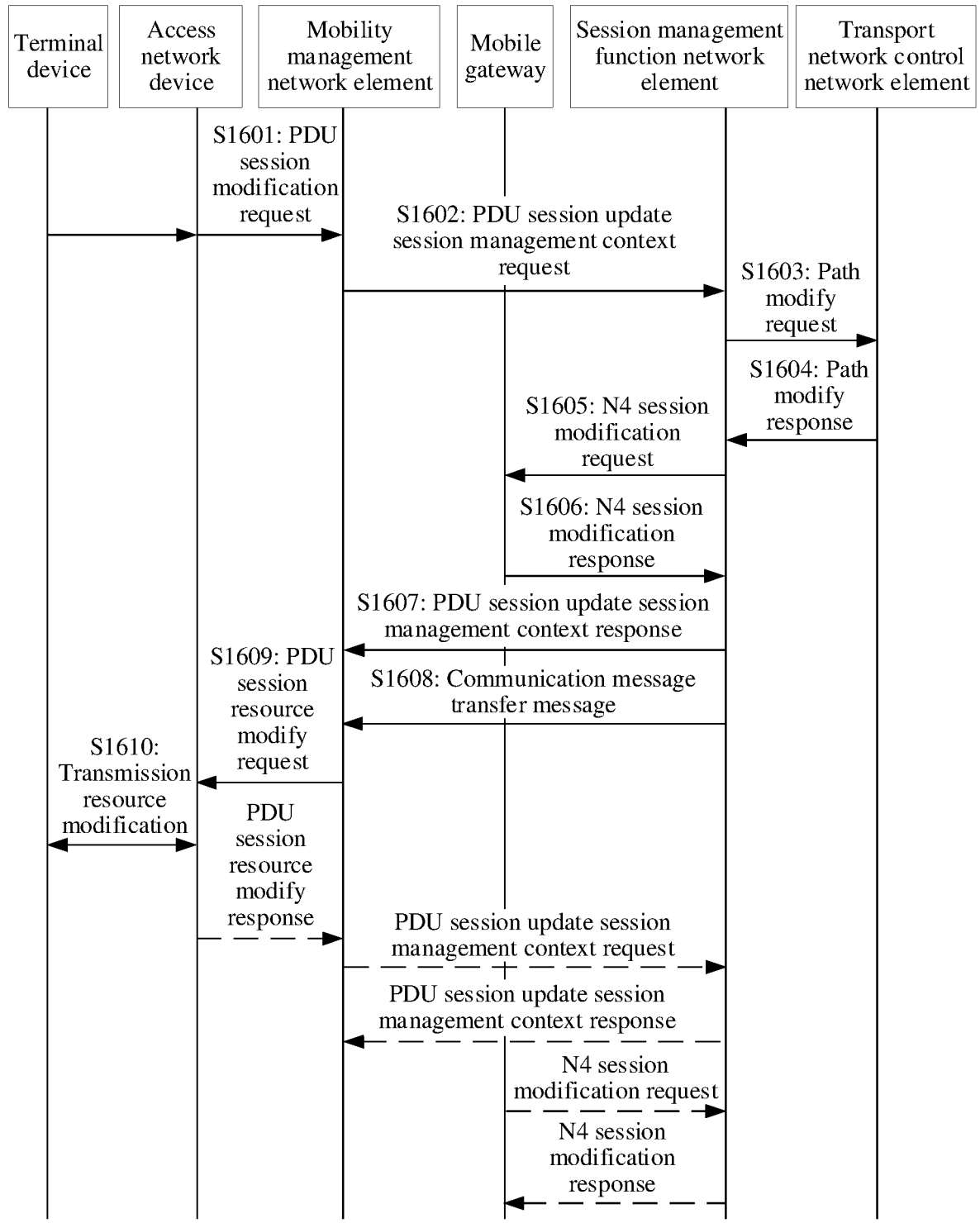
FIG. 16 is a schematic diagram of an example PDU session modification method according to an embodiment of the present disclosure.

Modification of a PDU session is used as an example. FIG. 16 is a schematic diagram of an example PDU session modification method. The method includes the following steps.

S1601: An access network device forwards a PDU session modification request (for example, a PDU session modification request) from a terminal device to a mobility management network element.

The PDU session modification request requests to modify one or more third QoS flows in the session.

S1602: The mobility management network element sends a PDU session update session management context request (for example, an Nsmf PDU session update SM context) to a session management function network element, and carries an identifier of the access network device and the PDU session modification request in the PDU session update session management context request.

S1603: The session management function network element sends a path modify request (for example, a service path modify request) to a transport network control network element.

The path modify request includes a service instance identifier or service instance identifiers and a second TN QoS parameter or second TN QoS parameters of the one or more third QoS flows.

S1604: The transport network control network element sends a path modify response (for example, a service path modify response) to the session management function network element. The path modify response includes the service instance identifier or the service instance identifiers of the one or more third QoS flows and information about a second TN transmission path or second TN transmission paths.

S1605: The session management function network element sends an N4 session modification request (for example, an N4 session modification request) to a mobile gateway.

The N4 session modification request includes the service instance identifier or the service instance identifiers of the one or more third QoS flows and the information about the second TN transmission path or the second TN transmission paths.

S1606: The mobile gateway sends an N4 session modification response (for example, an N4 session modification response) to the session management function network element.

S1607: The session management function network element sends a PDU session update session management context response (for example, an Nsmf PDU session update SM context) to the mobility management network element.

S1608: The session management function network element sends a communication message transfer message (for example, an Namf_communication_N1N2 message transfer message) to the mobility management network element.

The communication message transfer message may carry a PDU session resource modify request (for example, N2 PDU session resource modify), and the PDU session resource modify request includes the service instance identifier or the service instance identifiers of the one or more third QoS flows and the information about the second TN transmission path or the second TN transmission paths.

S1609: The mobility management network element sends the PDU session resource modify request to the access network device.

S1610: The access network device and the terminal device perform transmission resource modification including interaction of a PDU session modification command/acknowledgment (AN-specific resource modification of transport (including PDU session modification command/ACK)).

The access network device and the mobile gateway may forward data packets of the one or more third QoS flows based on the information about the second TN transmission path or the second TN transmission paths of the modified one or more third QoS flows.

Scenario 3: A QoS flow in a session is deleted.

Figure 17:
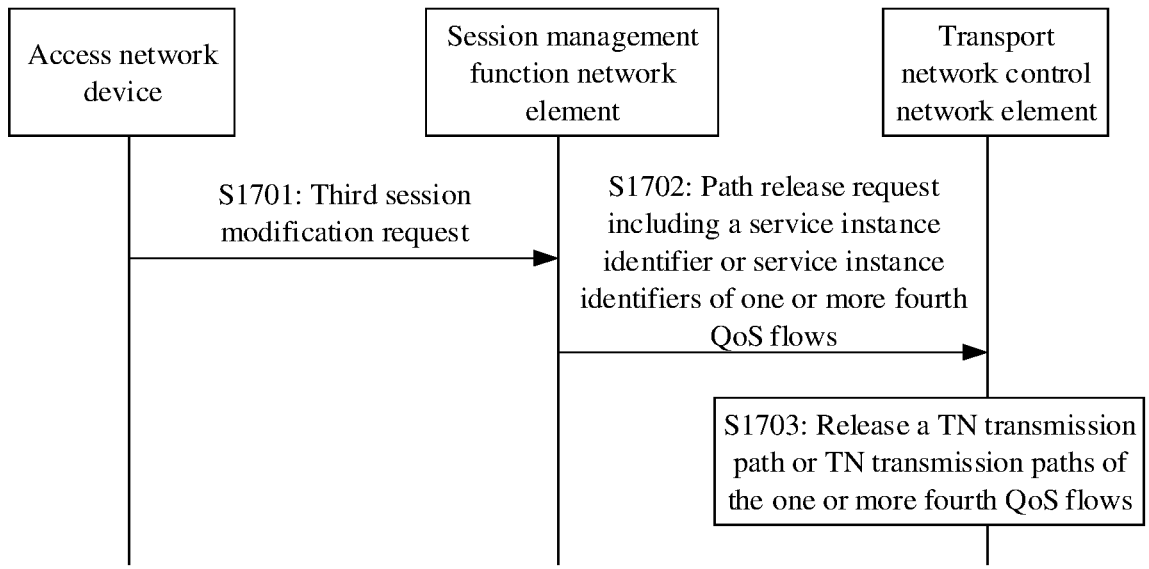
FIG. 17 is a schematic diagram of an example method for deleting a QoS flow in a session according to an embodiment of the present disclosure.

FIG. 17 shows an example method for deleting a QoS flow in a session according to an embodiment of the present disclosure. The method includes the following steps.

S1701: A session management function network element receives a third session modification request from an access network device.

The third session modification request is from a terminal device and requests to delete one or more fourth QoS flows in the session.

S1702: The session management function network element sends a path release request to a transport network control network element, and the transport network control network element receives the path release request, where the path release request includes a service instance identifier or service instance identifiers of the one or more fourth QoS flows.

S1703: The transport network control network element releases a TN transmission path or TN transmission paths of the one or more fourth QoS flows.

For a fourth QoS flow that has no data packet to be transmitted or that cannot meet a QoS parameter requirement in the session, the terminal device may initiate the third session modification request to delete the one or more fourth QoS flows in the session. After receiving the third session modification request from the terminal device, the session management function network element may send the path release request including the service instance identifier or the service instance identifiers of the one or more fourth QoS flows to the transport network control network element, to request the transport network control network element to release the TN transmission path or the TN transmission paths of the one or more fourth QoS flows. The transport network control network element releases the TN transmission path or the TN transmission paths of the one or more fourth QoS flows based on the service instance identifier or the service instance identifiers that are of the one or more fourth QoS flows and that are included in the path release request.

In an example, when information about a TN transmission path is a path identifier, the transport network control network element may delete a path identifier or path identifiers of the TN transmission path or the TN transmission paths of the one or more fourth QoS flows, and indicate the access network device and a mobile gateway to delete the path identifier or path identifiers of the TN transmission path or the TN transmission paths of the one or more fourth QoS flows and specific routing information corresponding to the path identifiers.

Figure 18:
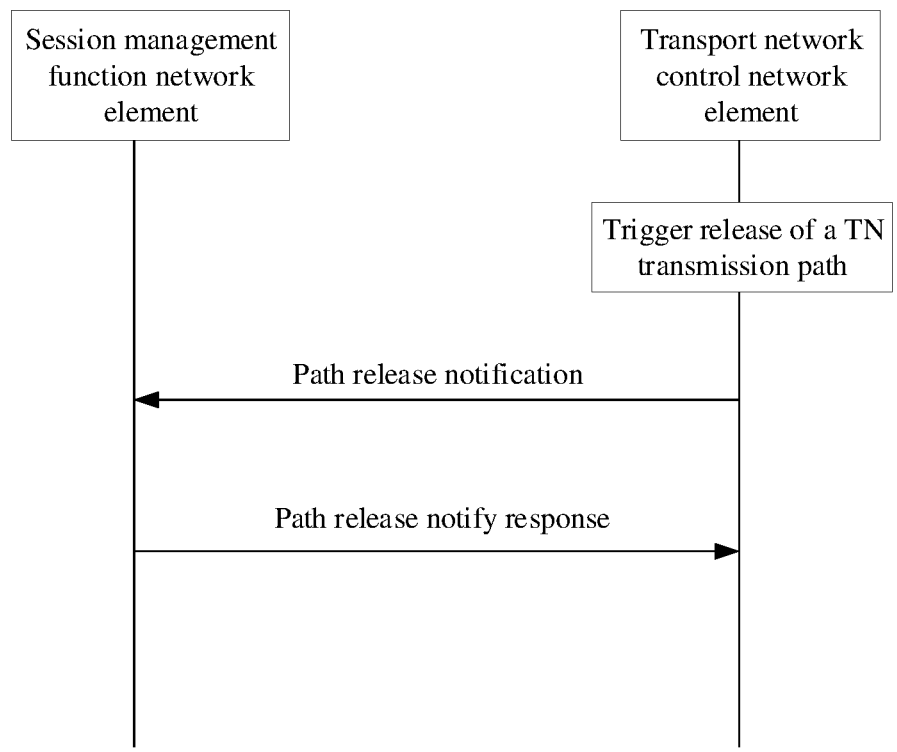
FIG. 18 is a schematic diagram of an example path release method according to an embodiment of the present disclosure.

In some implementations, as shown in FIG. 18, the transport network control network element may further monitor a TN transmission path of each QoS flow in the session. When there are one or more fifth QoS flows whose TN transmission path or TN transmission paths do not meet a TN QoS parameter or TN QoS parameters in the session, the transport network control network element sends a path release notification including a service instance identifier or service instance identifiers of the one or more fifth QoS flows to the session management function network element, to request the session management function network element to release the one or more fifth QoS flows, or reselect a mobile gateway for the session, thereby ensuring communication quality.

To ensure continuity of data packet transmission, when there are one or more fifth QoS flows whose TN transmission paths do not meet a TN QoS parameter or TN QoS parameters in the session, the transport network controller may first attempt to modify the TN transmission path or the TN transmission paths of the one or more fifth QoS flows, and if a modified TN transmission path meets a TN QoS parameter requirement, notify the access network device and the mobile gateway of information about the modified TN transmission path, or if the modified TN transmission path still does not meet the TN QoS parameter requirement, send the path release notification to the session management function network element.

In an example, if a binding ID of a TN transmission path corresponding to a QoS flow 1 is 11, the transport network control network element may periodically check whether a TN QoS parameter corresponding to the binding ID 11 meets a TN QoS parameter requirement of the QoS flow 1, and if the TN QoS parameter cannot meet the TN QoS parameter requirement, send a path release notification (for example, a service path release notify) carrying {QoS flow 1, Binding ID 11} to the session management function network element. The session management function network element determines, based on a situation, to release the QoS flow 1 or reselect a mobility management network element to re-establish the QoS flow 1, and returns a path release notify response (for example, a service path release notify response).

In addition, it should be understood that in new future networks such as a computing network and an edge computing network, unified scheduling needs to be considered based on a service requirement and a real-time status of a transport network, thereby meeting a QoS requirement of an upper-layer service and improving service experience. Therefore, the solutions in the embodiments of the present disclosure may also be applied to the new future networks such as the computing network and the edge computing network. Anode that can meet a service QoS requirement is selected based on QoS of a transport network between a service requirement node and a service provisioning node set, to meet an overall requirement of a service.

The foregoing mainly describes the solutions provided in the present disclosure from a perspective of interaction between the session management function network element, the transport network control network element, and the network management network element. It may be understood that, to implement the foregoing functions, each network element includes a corresponding hardware structure and/or software module (or unit) for performing each function. A person skilled in the art should be easily aware that, in combination with units and algorithm steps of the examples described in embodiments disclosed in this specification, the present disclosure may be implemented by using hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 19:
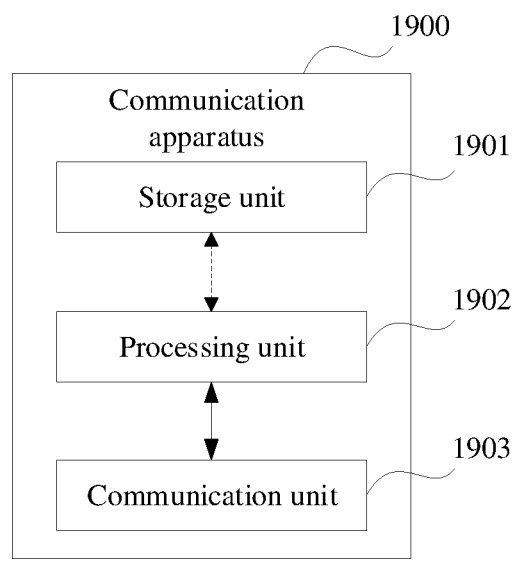
FIG. 19 is a first schematic diagram of an example communication apparatus according to an embodiment of the present disclosure.
Figure 20:
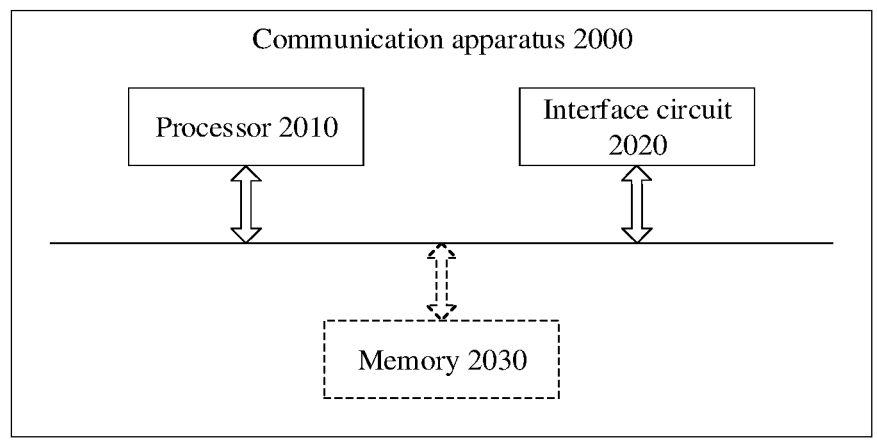
FIG. 20 is a second schematic diagram of an example communication apparatus according to an embodiment of the present disclosure.

FIG. 19 and FIG. 20 each are a schematic diagram of a structure of an example communication apparatus according to an embodiment of the present disclosure. These communication apparatuses may be configured to implement functions of the session management function network element, the transport network control network element, or the network management network element in the foregoing method embodiments, and therefore can also implement beneficial effects of the foregoing method embodiments. In this embodiment, the communication apparatus may be the session management function network element, the transport network control network element, or the network management network element in the foregoing method embodiments, or may be a module (for example, a chip) used in the session management function network element, the transport network control network element, or the network management network element.

As shown in FIG. 19, a communication apparatus 1900 may include a processing unit 1902 and a communication unit 1903, and may further include a storage unit 1901. The communication apparatus 1900 is configured to implement functions of the session management function network element, the transport network control network element, or the network management network element in the foregoing method embodiments.

In an example embodiment, the processing unit 1902 is configured to implement a corresponding processing function. The communication unit 1903 is configured to support communication between the communication apparatus 1900 and another network entity. The storage unit 1901 is configured to store program code and/or data of the communication apparatus 1900. Optionally, the communication unit 1903 may include a receiving unit and/or a sending unit, respectively configured to perform a receiving operation and a sending operation.

When the communication apparatus 1900 is configured to implement functions of the session management function network element in the method embodiment,
the communication unit 1903 is configured to receive a session establishment request from an access network device, where a session that the session establishment request requests to establish includes a first quality of service (QoS) flow;
the processing unit 1902 is configured to determine a first transport network (TN) QoS parameter of the first QoS flow, where the first TN QoS parameter of the first QoS flow is determined based on a TN QoS parameter mapped to a first service type of the first QoS flow, the access network device, and a mobile gateway selected for the session;
the communication unit 1903 is further configured to send a first path establish request to a transport network control network element, where the first path establish request includes an identifier of the access network device, an identifier of the mobile gateway, and a service instance identifier and the first TN QoS parameter that are of the first QoS flow; and
the communication unit 1903 is further configured to: receive a first path establish response from the transport network control network element, where the first path establish response includes the service instance identifier of the first QoS flow and information about a first TN transmission path; and send a session resource setup request to the access network device, where the session resource setup request includes the service instance identifier of the first QoS flow and the information about the first TN transmission path.

In an example embodiment, the communication unit 1903 is further configured to send a first N4 session establishment request to the mobile gateway, where the first N4 session establishment request includes the service instance identifier of the first QoS flow and the information about the first TN transmission path.

In an example embodiment, the communication unit 1903 is further configured to: send a QoS configuration request to a network management network element, where the QoS configuration request includes an identifier or identifiers of one or more mobile gateways managed by the session management function network element; and receive a QoS configuration response from the network management network element, where the QoS configuration response includes a mapping rule or mapping rules, corresponding to the one or more mobile gateways, between a TN QoS parameter, and a service type of a QoS flow, an access network device, and a mobile gateway.

In an example embodiment, the communication unit 1903 is further configured to: receive a first session modification request from the access network device, where the first session modification request requests to establish a second QoS flow in the session; and send a second path establish request to the transport network control network element, where the second path establish request includes the identifier of the access network device, the identifier of the mobile gateway, and a service instance identifier and a first TN QoS parameter that are of the second QoS flow, and the first TN QoS parameter of the second QoS flow is determined by the processing unit 1902 based on a TN QoS parameter mapped to a first service type of the second QoS flow, the access network device, and the mobile gateway; and receive a second path establish response from the transport network control network element, where the second path establish response includes the service instance identifier of the second QoS flow and information about a first TN transmission path; and send a first session resource modify request to the access network device, where the first session resource modify request includes the service instance identifier of the second QoS flow and the information about the first TN transmission path.

In an example embodiment, the communication unit 1903 is further configured to send a second N4 session establishment request to the mobile gateway, where the second N4 session establishment request includes the service instance identifier of the second QoS flow and the information about the first TN transmission path.

In an example embodiment, the communication unit 1903 is further configured to: receive a second session modification request from the access network device, where the second session modification request requests to modify a third QoS flow in the session; and send a path modify request to the transport network control network element, where the path modify request includes a service instance identifier and a second TN QoS parameter that are of the third QoS flow, and the second TN QoS parameter of the third QoS flow is determined by the processing unit 1902 based on a TN QoS parameter mapped to a second service type of the third QoS flow, the access network device, and the mobile gateway; and receive a path modify response from the transport network control network element, where the path modify response includes the service instance identifier of the third QoS flow and information about a second TN transmission path; and send a second session resource modify request to the access network device, where the second session resource modify request includes the service instance identifier of the third QoS flow and the information about the second TN transmission path.

In an example embodiment, the communication unit 1903 is further configured to send an N4 session modification request to the mobile gateway, where the N4 session modification request includes the service instance identifier of the third QoS flow and the information about the second TN transmission path.

In an example embodiment, the communication unit 1903 is further configured to: receive a third session modification request from the access network device, where the third session modification request requests to delete a fourth QoS flow in the session; and send a path release request to the transport network control network element, where the path release request includes a service instance identifier of the fourth QoS flow.

In an example embodiment, the communication unit 1903 is further configured to receive a path release notification from the transport network control network element, where the path release notification includes a service instance identifier of a fifth QoS flow in the session; and the processing unit 1902 is further configured to: release the fifth QoS flow, or reselect a mobile gateway for the session.

In an example embodiment, the TN QoS parameter includes:
a scheduling priority, a transmission delay, a packet error rate, a maximum flow rate, and/or a guaranteed flow rate.

When the communication apparatus 1900 is configured to implement functions of the transport network control network element in the method embodiment, the communication unit 1903 is configured to receive a first path establish request from a session management function network element, where the first path establish request includes an identifier of an access network device, an identifier of a mobile gateway, and a service instance identifier and a first transport network (TN) QoS parameter that are of a first QoS flow;

the processing unit 1902 is configured to determine a first TN transmission path between the access network device and the mobile gateway for the first QoS flow based on the first TN QoS parameter of the first QoS flow; and the communication unit 1903 is further configured to send a first path establish response to the session management function network element, where the first path establish response includes the service instance identifier of the first QoS flow and information about the first TN transmission path.

In an example embodiment, the communication unit 1903 is further configured to receive a second path establish request from the session management function network element, where the second path establish request includes the identifier of the access network device, the identifier of the mobile gateway, and a service instance identifier and a first TN QoS parameter that are of a second QoS flow;

the processing unit 1902 is further configured to determine a first TN transmission path between the access network device and the mobile gateway for the second QoS flow based on the first TN QoS parameter of the second QoS flow; and the communication unit 1903 is further configured to send a second path establish response to the session management function network element, where the second path establish response includes the service instance identifier of the second QoS flow and information about the first TN transmission path.

In an example embodiment, the communication unit 1903 is further configured to receive a path modify request from the session management function network element, where the path modify request includes a service instance identifier and a second TN QoS parameter that are of a third QoS flow;

the processing unit 1902 is further configured to determine a second TN transmission path between the access network device and the mobile gateway for the third QoS flow based on the second TN QoS parameter of the third QoS flow; and the communication unit 1903 is further configured to send a path modify response to the session management function network element, where the path modify response includes the service instance identifier of the third QoS flow and information about the second TN transmission path.

In an example embodiment, the communication unit 1903 is further configured to receive a path release request from the session management function network element, where the path release request includes a service instance identifier of a fourth QoS flow; and The processing unit 1902 is further configured to release a TN transmission path of the fourth QoS flow.

In an example embodiment, the communication unit 1903 is further configured to: when the processing unit 1902 determines that there is a fifth QoS flow whose TN transmission path does not meet a TN QoS parameter, send a path release notification to the session management function network element, where the path release notification includes a service instance identifier of the fifth QoS flow.

In an example embodiment, the TN QoS parameter includes: a scheduling priority, a transmission delay, a packet error rate, a maximum flow rate, and/or a guaranteed flow rate.

When the communication apparatus 1900 is configured to implement functions of the network management network element in the method embodiment, the communication unit 1903 is configured to receive a quality of service (QoS) configuration request from a session management function network element, where the QoS configuration request includes an identifier or identifiers of one or more mobile gateways managed by the session management function network element;

the processing unit 1902 is configured to determine a mapping rule or mapping rules, corresponding to the one or more mobile gateways, between a TN QoS parameter, and a service type of a QoS flow, an access network device, and a mobile gateway; and the communication unit 1903 is further configured to send a QoS configuration response to the session management function network element, where the QoS configuration response includes the mapping rule or the mapping rules, corresponding to the one or more mobile gateways, between a TN QoS parameter, and a service type of a QoS flow, an access network device, and a mobile gateway.

For more detailed descriptions about the processing unit 1902 and the communication unit 1903, refer to the related descriptions in the method embodiments directly.

As shown in FIG. 20, a communication apparatus 2000 includes a processor 2010 and an interface circuit 2020. The processor 2010 and the interface circuit 2020 are coupled to each other. It may be understood that the interface circuit 2020 may be a transceiver or an input/output interface. Optionally, the communication apparatus 2000 may further include a memory 2030, configured to store instructions to be executed by the processor 2010, store input data required for executing the instructions by the processor 2010, or store data generated after the processor 2010 executes the instructions.

When the communication apparatus 2000 is configured to implement the communication method applicable to the session management function network element, the transport network control network element, or the network management network element in the foregoing method embodiments, the processor 2010 is configured to implement a function of the processing unit 1902, and the interface circuit 2020 is configured to implement a function of the communication unit 1903.

In another form of this embodiment, a computer-readable storage medium is provided. The computer-readable storage medium stores instructions. When the instructions are executed, the communication method applicable to the session management function network element, the transport network control network element, or the network management network element in the foregoing method embodiments may be performed.

In another form of this embodiment, a computer program product including instructions is provided. When the instructions are executed, the communication method applicable to the session management function network element, the transport network control network element, or the network management network element in the foregoing method embodiments may be performed.

In another form of this embodiment, a chip is provided. When the chip runs, the communication method applicable to the session management function network element, the transport network control network element, or the network management network element in the foregoing method embodiments may be performed.

A person skilled in the art should understand that embodiments of the present disclosure may be provided as a method, a system, or a computer program product. Therefore, the present disclosure may use a form of a hardware-only embodiment, a software-only embodiment, or an embodiment with a combination of software and hardware. In addition, the present disclosure may use a form of a computer program product implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

Although some preferred embodiments of the present disclosure have been described, a person skilled in the art can make changes and modifications to these embodiments once they learn the basic inventive concept. Therefore, the following claims are intended to be construed as to cover the preferred embodiments and all changes and modifications falling within the scope of the present disclosure.

Clearly, a person skilled in the art can make various modifications and variations to embodiments of the present disclosure without departing from the spirit and scope of embodiments of the present disclosure. In this case, the present disclosure is intended to cover these modifications and variations of the embodiments of the present disclosure provided that they fall within the scope of protection defined by the following claims and their equivalent technologies.

What is claimed is:

1. A communication method, comprising:

receiving, by a session management function network element, a session establishment request from an access network device, wherein a session that the session establishment request requests to establish comprises a first quality of service (QoS) flow;

sending, by the session management function network element, a first path establish request to a transport network control network element, wherein the first path establish request requests to establish a path and comprises an identifier of the access network device, an identifier of a mobile gateway selected for the session, and a service instance identifier and a first transport network (TN) QoS parameter that are of the first QoS flow, and the first TN QoS parameter of the first QoS flow is determined based on a TN QoS parameter mapped to a first service type of the first QoS flow, the access network device, and the mobile gateway;

receiving, by the session management function network element, a first path establish response from the transport network control network element, wherein the first path establish response comprises the service instance identifier of the first QoS flow and information about a first TN transmission path; and sending, by the session management function network element, a session resource setup request to the access network device, wherein the session resource setup request requests to setup one or more session resources and comprises the service instance identifier of the first QoS flow and the information about the first TN transmission path.

2. The method according to claim 1, further comprising:

sending, by the session management function network element, a first N4 session establishment request to the mobile gateway, wherein the first N4 session establishment request requests to establish an N4 session and comprises the service instance identifier of the first QoS flow and the information about the first TN transmission path, N4 being an interface between the mobile gateway and the session management function network element.

3. The method according to claim 1, further comprising:

sending, by the session management function network element, a QoS configuration request to a network management network element, wherein the QoS configuration request requests for QoS configuration information and comprises an identifier or identifiers of one or more mobile gateways managed by the session management function network element; and receiving, by the session management function network element, a QoS configuration response from the network management network element, wherein the QoS configuration response comprises a mapping rule or mapping rules, corresponding to the one or more mobile gateways, between a TN QoS parameter, and a service type of a QoS flow, the access network device, and the mobile gateway.

4. The method according to claim 1, further comprising:

receiving, by the session management function network element, a first session modification request from the access network device, wherein the first session modification request requests to establish a second QoS flow in the session;

sending, by the session management function network element, a second path establish request to the transport network control network element, wherein the second path establish request requests to establish a path and comprises the identifier of the access network device, the identifier of the mobile gateway, and a service instance identifier and a first TN QoS parameter that are of the second QoS flow, and the first TN QoS parameter of the second QoS flow is determined based on a TN QoS parameter mapped to a first service type of the second QoS flow, the access network device, and the mobile gateway;

receiving, by the session management function network element, a second path establish response from the transport network control network element, wherein the second path establish response comprises the service instance identifier of the second QoS flow and information about a first TN transmission path; and sending, by the session management function network element, a first session resource modify request to the access network device, wherein the first session resource modify request requests to modify one or more session resources and comprises the service instance identifier of the second QoS flow and the information about the first TN transmission path.

5. The method according to claim 4, further comprising:

sending, by the session management function network element, a second N4 session establishment request to the mobile gateway, wherein the second N4 session establishment request requests to setup an N4 session and comprises the service instance identifier of the second QoS flow and the information about the first TN transmission path, N4 being an interface between the mobile gateway and the session management function network element.

6. The method according to claim 1, further comprising:

receiving, by the session management function network element, a second session modification request from the access network device, wherein the second session modification request requests to modify a third QoS flow in the session;

sending, by the session management function network element, a path modify request to the transport network control network element, wherein the path modify request requests to modify a path and comprises a service instance identifier and a second TN QoS parameter that are of the third QoS flow, and the second TN QoS parameter of the third QoS flow is determined based on a TN QoS parameter mapped to a second service type of the third QoS flow, the access network device, and the mobile gateway;

receiving, by the session management function network element, a path modify response from the transport network control network element, wherein the path modify response comprises the service instance identifier of the third QoS flow and information about a second TN transmission path; and sending, by the session management function network element, a second session resource modify request to the access network device, wherein the second session resource modify request requests to modify one or more session resources and comprises the service instance identifier of the third QoS flow and the information about the second TN transmission path.

7. The method according to claim 6, further comprising:
sending, by the session management function network element, an N4 session modification request to the mobile gateway, wherein the N4 session modification request requests to modify an N4 session and comprises the service instance identifier of the third QoS flow and the information about the second TN transmission path, N4 being an interface between the mobile gateway and the session management function network element.

8. The method according to claim 1, further comprising:
receiving, by the session management function network element, a third session modification request from the access network device, wherein the third session modification request requests to delete a fourth QoS flow in the session; and
sending, by the session management function network element, a path release request to the transport network control network element, wherein the path release request requests to release a path and comprises a service instance identifier of the fourth QoS flow.

9. The method according to claim 1, further comprising:
receiving, by the session management function network element, a path release notification from the transport network control network element, wherein the path release notification comprises a service instance identifier of a fifth QoS flow in the session; and
releasing, by the session management function network element, the fifth QoS flow, or reselecting a mobile gateway for the session.

10. The method according to claim 1, wherein the TN QoS parameter comprises:
a scheduling priority, a transmission delay, a packet error rate, a maximum flow rate, and/or a guaranteed flow rate.

11. A communication method, comprising:
receiving, by a transport network control network element, a first path establish request from a session management function network element, wherein the first path establish request requests to establish a path and comprises an identifier of an access network device, an identifier of a mobile gateway, and a service instance identifier and a first transport network (TN) QoS parameter that are of a first QoS flow;
determining, by the transport network control network element, a first TN transmission path between the access network device and the mobile gateway for the first QoS flow based on the first TN QoS parameter of the first QoS flow; and
sending, by the transport network control network element, a first path establish response to the session management function network element, wherein the first path establish response comprises the service instance identifier of the first QoS flow and information about the first TN transmission path.

12. The method according to claim 11, further comprising:
receiving, by the transport network control network element, a second path establish request from the session management function network element, wherein the second path establish request requests to establish a path and comprises the identifier of the access network device, the identifier of the mobile gateway, and a service instance identifier and a first TN QoS parameter that are of a second QoS flow;
determining, by the transport network control network element, a first TN transmission path between the access network device and the mobile gateway for the second QoS flow based on the first TN QoS parameter of the second QoS flow; and
sending, by the transport network control network element, a second path establish response to the session management function network element, wherein the second path establish response comprises the service instance identifier of the second QoS flow and information about the first TN transmission path.

13. The method according to claim 11, further comprising:
receiving, by the transport network control network element, a path modify request from the session management function network element, wherein the path modify request requests to modify a path and comprises a service instance identifier and a second TN QoS parameter that are of a third QoS flow;
determining, by the transport network control network element, a second TN transmission path between the access network device and the mobile gateway for the third QoS flow based on the second TN QoS parameter of the third QoS flow; and
sending, by the transport network control network element, a path modify response to the session management function network element, wherein the path modify response comprises the service instance identifier of the third QoS flow and information about the second TN transmission path.

14. The method according to claim 11, further comprising:
receiving, by the transport network control network element, a path release request from the session management function network element, wherein the path release request requests to release a path and comprises a service instance identifier of a fourth QoS flow; and
releasing, by the transport network control network element, a TN transmission path of the fourth QoS flow.

15. The method according to claim 11, further comprising:
when the transport network control network element determines that there is a fifth QoS flow whose TN transmission path does not meet a TN QoS parameter, sending, by the transport network control network element, a path release notification to the session management function network element, wherein the path release notification comprises a service instance identifier of the fifth QoS flow.

16. The method according to claim 11, wherein the TN QoS parameter comprises:
a scheduling priority, a transmission delay, a packet error rate, a maximum flow rate, and/or a guaranteed flow rate.

17. A communication method, comprising:
receiving, by a network management network element, a quality of service (QoS) configuration request from a session management function network element, wherein the QoS configuration request requests for QoS configuration information and comprises an identifier or identifiers of one or more mobile gateways managed by the session management function network element; and
sending, by the network management network element, a QoS configuration response to the session management function network element, wherein the QoS configuration response comprises a mapping rule or mapping rules, corresponding to the one or more mobile gateways, between a TN QoS parameter, and a service type of a QoS flow, an access network device, and a mobile gateway.

18. A chip system, comprising:
at least one processor and an interface, wherein the at least one processor is configured to invoke instructions from the interface and run the instructions, and when the at least one processor executes the instructions, cause the at least one processor to perform operations comprising:
receiving, by a session management function network element, a session establishment request from an access network device, wherein a session that the session establishment request requests to establish comprises a first quality of service (QoS) flow;
sending, by the session management function network element, a first path establish request to a transport network control network element, wherein the first path establish request requests to establish a path and comprises an identifier of the access network device, an identifier of a mobile gateway selected for the session, and a service instance identifier and a first transport network (TN) QoS parameter that are of the first QoS flow, and the first TN QoS parameter of the first QoS flow is determined based on a TN QoS parameter mapped to a first service type of the first QoS flow, the access network device, and the mobile gateway;
receiving, by the session management function network element, a first path establish response from the transport network control network element, wherein the first path establish response comprises the service instance identifier of the first QoS flow and information about a first TN transmission path; and
sending, by the session management function network element, a session resource setup request to the access network device, wherein the session resource setup request requests to setup one or more session resources and comprises the service instance identifier of the first QoS flow and the information about the first TN transmission path.

19. The chip system according to claim 18, further comprising:
sending, by the session management function network element, a first N4 session establishment request to the mobile gateway, wherein the first N4 session establishment request requests to establish an N4 session and comprises the service instance identifier of the first QoS flow and the information about the first TN transmission path, N4 being an interface between the mobile gateway and the session management function network element.

20. The chip system according to claim 18, further comprising:
sending, by the session management function network element, a QoS configuration request to a network management network element, wherein the QoS configuration request requests for QoS configuration information and comprises an identifier or identifiers of one or more mobile gateways managed by the session management function network element; and
receiving, by the session management function network element, a QoS configuration response from the network management network element, wherein the QoS configuration response comprises a mapping rule or mapping rules, corresponding to the one or more mobile gateways, between a TN QoS parameter, and a service type of a QoS flow, the access network device, and the mobile gateway.

\* \* \* \* \*